(12) United States Patent
Naruse

(10) Patent No.: US 12,138,969 B2
(45) Date of Patent: Nov. 12, 2024

(54) PNEUMATIC TIRE

(71) Applicant: The Yokohama Rubber Co., LTD., Tokyo (JP)

(72) Inventor: Masahiro Naruse, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 269 days.

(21) Appl. No.: 17/929,018

(22) PCT Filed: Feb. 12, 2021

(86) PCT No.: PCT/JP2021/005235
§ 371 (c)(1),
(2) Date: Aug. 10, 2022

(87) PCT Pub. No.: WO2021/166798
PCT Pub. Date: Aug. 26, 2021

(65) Prior Publication Data
US 2023/0158841 A1  May 25, 2023

(30) Foreign Application Priority Data

Feb. 17, 2020 (JP) .................... 2020-024286
Feb. 17, 2020 (JP) .................... 2020-024287
Feb. 17, 2020 (JP) .................... 2020-024288

(51) Int. Cl.
*B60C 23/04* (2006.01)
*B60C 9/02* (2006.01)
(Continued)

(52) U.S. Cl.
CPC .......... *B60C 23/0433* (2013.01); *B60C 15/06* (2013.01); *B60C 23/0408* (2013.01);
(Continued)

(58) Field of Classification Search
CPC ............... B60C 23/0433; B60C 15/06; B60C 2009/0276; B60C 2019/004;
(Continued)

(56) References Cited

U.S. PATENT DOCUMENTS 6,885,291 B1 * 4/2005 Pollack ............... B60C 23/0493
340/447
6,899,153 B1 * 5/2005 Pollack ............... B60C 23/0408
156/110.1
(Continued)

FOREIGN PATENT DOCUMENTS

DE 112022002093 T5 * 3/2024
JP H07-137510 A 5/1995
(Continued)

Primary Examiner — Stephanie E Bloss
Assistant Examiner — Kevin C Butler
(74) Attorney, Agent, or Firm — Thorpe North & Western

(57) ABSTRACT

In a pneumatic tire with a carcass layer mounted between a pair of bead portions, a transponder is embedded in an outer side of the carcass layer in the tire width direction, a rubber member having the largest storage modulus at 20° C. of rubber members located on an outer side of the transponder in the tire width direction has a modulus M50out(0° C.) during 50% deformation at 0° C. and a modulus M50out(−20° C.) during 50% deformation at −20° C. that satisfy a relationship 0.50≤M50out(0° C.)/M50out(−20° C.)<1.00, and a rubber member having the largest storage modulus at 20° C. of rubber members located on an inner side of the transponder in the tire width direction has a modulus M50in (0° C.) during 50% deformation at 0° C. and a modulus M50in(−20° C.) during 50% deformation at −20° C. that satisfy a relationship 0.25≤M50in(0° C.)/M50in(−20° C.)<1.00.

22 Claims, 6 Drawing Sheets

(51) Int. Cl.
 *B60C 15/06* (2006.01)
 *B60C 19/00* (2006.01)
 *G01M 17/02* (2006.01)
(52) U.S. Cl.
 CPC .......... *G01M 17/02* (2013.01); *G01M 17/021* (2013.01); *G01M 17/022* (2013.01); *G01M 17/027* (2013.01); *B60C 2009/0276* (2013.01); *B60C 2019/004* (2013.01)
(58) Field of Classification Search
 CPC . B60C 23/0408; G01M 17/022; G01M 17/02; G01M 17/027; G01M 17/021
 USPC .......................................................... 73/146
 See application file for complete search history.

(56) References Cited

U.S. PATENT DOCUMENTS

| | | | | |
|---|---|---|---|---|
| 2012/0000588 | A1* | 1/2012 | Tanno | B60C 19/002 |
| | | | | 152/450 |
| 2019/0001600 | A1* | 1/2019 | Tanno | B29D 30/0681 |
| 2022/0371386 | A1* | 11/2022 | Destraves | B60C 23/0452 |
| 2023/0078031 | A1* | 3/2023 | Naruse | B60C 19/00 |
| | | | | 152/45 |
| 2023/0079114 | A1* | 3/2023 | Naruse | B60C 15/06 |
| | | | | 152/543 |
| 2023/0080547 | A1* | 3/2023 | Naruse | B60C 19/00 |
| | | | | 152/539 |
| 2023/0112786 | A1* | 4/2023 | Naruse | B60C 19/00 |
| | | | | 73/146 |
| 2023/0158841 | A1* | 5/2023 | Naruse | B60C 15/06 |
| | | | | 73/146 |

FOREIGN PATENT DOCUMENTS

| | | | | | |
|---|---|---|---|---|---|
| JP | 2007-230261 | A | | 9/2007 | |
| JP | 2016-37235 | A | | 3/2016 | |
| JP | 2016-539047 | A | | 12/2016 | |
| JP | 6594509 | B1 | | 10/2019 | |
| JP | 2021127072 | A | * | 9/2021 | ............. B60C 15/06 |
| JP | 2021127087 | A | * | 9/2021 | ............. B60C 15/06 |
| JP | 2021127090 | A | * | 9/2021 | ............. B60C 15/06 |
| JP | 2021127091 | A | * | 9/2021 | ............. B60C 15/06 |
| JP | 2021187267 | A | * | 12/2021 | |
| JP | 7279671 | B2 | * | 5/2023 | |
| JP | 2023102465 | | * | 7/2023 | ............. B60C 15/06 |
| JP | 7343786 | B2 | * | 9/2023 | ............. B60C 15/06 |
| KR | 20230049239 | A | * | 4/2023 | ............. B60C 19/00 |
| KR | 20230059655 | A | * | 5/2023 | ............. B60C 19/00 |
| RU | 2796079 | C2 | * | 5/2023 | ......... B60C 15/0045 |
| WO | WO-0136220 | A1 | * | 5/2001 | ......... B60C 23/0408 |
| WO | 2019/054210 | A1 | | 3/2019 | |
| WO | 2019/054212 | A1 | | 3/2019 | |
| WO | 2019/054213 | A1 | | 3/2019 | |
| WO | 2019/054226 | A1 | | 3/2019 | |
| WO | WO-2021166792 | A1 | * | 8/2021 | ............. B60C 15/06 |
| WO | WO-2021166793 | A1 | * | 8/2021 | ............. B60C 15/06 |
| WO | WO-2021166794 | A1 | * | 8/2021 | ............. B60C 15/06 |
| WO | WO-2021166798 | A1 | * | 8/2021 | ............. B60C 15/06 |
| WO | WO-2021166799 | A1 | * | 8/2021 | ............. B60C 15/06 |
| WO | WO-2021166800 | A1 | * | 8/2021 | ......... B60C 15/0607 |

* cited by examiner

PNEUMATIC TIRE

TECHNICAL FIELD

The present technology relates to a pneumatic tire with a transponder embedded and relates particularly to a pneumatic tire that can provide improved durability while ensuring communication performance and durability of the transponder.

BACKGROUND ART

For pneumatic tires, embedding an RFID (radio frequency identification) tag (transponder) in a tire has been proposed (see, for example, Japan Unexamined Patent Publication No. H07-137510). Disposing the transponder on an inner side of a carcass layer in a tire width direction causes radio waves to be blocked by tire components (metal members, such as a carcass or reinforcement made of steel) during communication of the transponder, and the communication performance of the transponder may be degraded. Additionally, in a case where the transponder is embedded in the tire, the tire components are brittle at the start of traveling in a low temperature environment, and thus a failure originating from the transponder is likely to occur. This may degrade the durability of the tire. In the case where the transponder is embedded in the tire, when the tire generates heat during traveling at high speed to soften rubber members around the transponder, the deformation of the tire is transmitted to the transponder, and the transponder may be damaged. Furthermore, depending on physical properties of a rubber member adjacent to an inner side or an outer side of the transponder in the tire width direction, stress concentration may occur during the tire deformation, degrading the durability of the transponder.

SUMMARY

The present technology provides a pneumatic tire that can provide improved durability while ensuring communication performance and durability of a transponder.

A pneumatic tire according to a first embodiment includes a tread portion extending in a tire circumferential direction and having an annular shape, a pair of sidewall portions respectively disposed on both sides of the tread portion, a pair of bead portions each disposed on an inner side of the pair of sidewall portions in a tire radial direction, and a carcass layer mounted between the pair of bead portions. In the pneumatic tire, a transponder is embedded in an outer side of the carcass layer in the tire width direction, a rubber member having the largest storage modulus at 20° C. of rubber members located on an outer side of the transponder in the tire width direction has a modulus M50out(0° C.) during 50% deformation at 0° C. and a modulus M50out(−20° C.) during 50% deformation at −20° C. that satisfy a relationship $0.50 \leq M50out(0° C.)/M50out(−20° C.) < 1.00$, and a rubber member having the largest storage modulus at 20° C. of rubber members located on an inner side of the transponder in the tire width direction has a modulus M50in (0° C.) during 50% deformation at 0° C. and a modulus M50in(−20° C.) during 50% deformation at −20° C. that satisfy are relationship $0.25 \leq M50in(0° C.)/M50in(−20° C.) < 1.00$.

A pneumatic tire according to a second embodiment includes a tread portion extending in a tire circumferential direction and having an annular shape, a pair of sidewall portions respectively disposed on both sides of the tread portion, a pair of bead portions each disposed on an inner side of the pair of sidewall portions in a tire radial direction, and a carcass layer mounted between the pair of bead portions. In the pneumatic tire, a transponder is embedded in an outer side of the carcass layer in the tire width direction, a rubber member having the largest storage modulus at 20° C. of rubber members located on an outer side of the transponder in the tire width direction has a modulus M50out(20° C.) during 50% deformation at 20° C. and a modulus M50out(100° C.) during 50% deformation at 100° C. that satisfy a relationship $1.0 \leq M50out(20° C.)/M50out(100° C.) < 2.5$, and a rubber member having the largest storage modulus at 20° C. of rubber members located on an inner side of the transponder in the tire width direction has a modulus M50in(20° C.) during 50% deformation at 20° C. and a modulus M50in(100° C.) during 50% deformation at 100° C. that satisfy a relationship $1.0 < M50in(20° C.)/M50in(100° C.) < 4.0$.

A pneumatic tire according to a third embodiment includes a tread portion extending in a tire circumferential direction and having an annular shape, a pair of sidewall portions respectively disposed on both sides of the tread portion, a pair of bead portions each disposed on an inner side of the pair of sidewall portions in a tire radial direction, and a carcass layer mounted between the pair of bead portions. In the pneumatic tire, a transponder is embedded in an outer side of the carcass layer in the tire width direction, and an absolute value $|M50out(50° C.) − M50in(50° C.)|$ of a difference between a modulus M50out(50° C.) during 50% deformation at 50° C. of a rubber member having the largest storage modulus at 20° C. of rubber members located on an outer side of the transponder in the tire width direction and a modulus M50in(50° C.) during 50% deformation at 50° C. of a rubber member having the largest storage modulus at 20° C. of rubber members located on an inner side of the transponder in the tire width direction is 10 MPa or less.

In the first embodiment, the transponder is embedded in the outer side of the carcass layer in the tire width direction, and thus no tire component that blocks radio waves during communication of the transponder, and the communication performance of the transponder can be ensured. In addition, the rubber member having the largest storage modulus at 20° C. of the rubber members located on the outer side of the transponder in the tire width direction has a modulus M50out(0° C.) during 50% deformation at 0° C. and a modulus M50out(−20° C.) during 50% deformation at −20° C. that satisfy the relationship formula described above, and the rubber member having the largest storage modulus at 20° C. of the rubber members located on the inner side of the transponder in the tire width direction has a modulus M50in (0° C.) during 50% deformation at 0° C. and a modulus M50in(−20° C.) during 50% deformation at −20° C. that satisfy the relationship formula described above. This allows embrittlement of hard rubber members located inside and outside the transponder to be avoided in a low temperature environment and stress concentration during the tire deformation to be suppressed. This can provide the improved durability while ensuring the durability of the transponder.

In the second embodiment, the transponder is embedded in the outer side of the carcass layer in the tire width direction, and thus no tire components block radio waves during the communication of the transponder, allowing communication performance of the transponder to be ensured. In addition, the rubber member having the largest storage modulus at 20° C. of the rubber members located on the outer side of the transponder in the tire width direction has a modulus M50out(20° C.) during 50% deformation at 20° C. and a modulus M50out(100° C.) during 50% deformation at 100° C. that satisfy the relationship formula described above, and the rubber member having the largest storage modulus at 20° C. of the rubber members located on the inner side of the transponder in the tire width direction has a modulus M50in(20° C.) during 50% deformation at 20° C. and a modulus M50in(100° C.) during 50% deformation at 100° C. that satisfy the relationship formula described above. This allows for suppressing softening of the hard rubber members located inside and outside the transponder and ensuring a protection effect on the transponder even in a case where the tire is at high temperature as well as suppressing stress concentration during tire deformation. This can provide the improved durability while ensuring the durability of the transponder.

In the third embodiment, the transponder is embedded in the outer side of the carcass layer in the tire width direction, and thus no tire components block radio waves during the communication of the transponder, allowing the communication performance of the transponder to be ensured. In addition, the absolute value |M50out(50° C.)−M50in(50° C.)| of the difference between the modulus M50out(50° C.) during 50% deformation at 50° C. of the rubber member having the largest storage modulus at 20° C. of the rubber members located on an outer side of the transponder in the tire width direction and the modulus M50in(50° C.) during 50% deformation at 50° C. of the rubber member having the largest storage modulus at 20° C. of the rubber members located on the inner side of the transponder in the tire width direction is 10 MPa or less. This reduces the difference between the moduli during 50% deformation of the hard rubber members located inside and outside the transponder even in a case where the tire is at high temperature, allowing suppression of stress concentration at a surface of the transponder during tire deformation. This can provide the improved durability of the transponder while ensuring the durability of the tire.

In the pneumatic tire according to the first embodiment, preferably, the transponder is covered with a coating layer, and a storage modulus E'c(0° C.) at 0° C. of the coating layer and a storage modulus E'a(0° C.) at 0° C. of the rubber member adjacent to an outer side of the coating layer in the tire width direction satisfy a relationship 0.15≤E'c(0° C.)/E'a(0° C.)≤1.30. This makes the physical properties of the coating layer close to those of the rubber member adjacent to the coating layer, enabling a stress distribution effect during traveling to be obtained and the durability of the transponder to be effectively improved.

In the pneumatic tire according to the first embodiment, preferably, the transponder is covered with the coating layer, and a storage modulus E'c(−20° C.) at −20° C. of the coating layer and a storage modulus E'a(−20° C.) at −20° C. of the rubber member adjacent to the outer side of the coating layer in the tire width direction satisfy a relationship 0.15≤E'c(−20° C.)/E'a(−20° C.)≤1.30. This makes the physical properties of the coating layer close to those of the rubber member adjacent to the coating layer, enabling a stress distribution effect during traveling to be obtained and the durability of the transponder to be effectively improved.

In the pneumatic tire according to the first embodiment, preferably, the transponder is covered with the coating layer, and the storage modulus E'c(−20° C.) at −20° C. of the coating layer is in a range from 3 MPa to 17 MPa. This allows the durability of the transponder to be effectively improved.

In the pneumatic tire of the first embodiment, preferably, the transponder is covered with the coating layer, and the storage modulus E'c(0° C.) at 0° C. of the coating layer and the storage modulus E'c(−20° C.) at −20° C. of the coating layer satisfy a relationship 0.50≤E'c(0° C.)/E'c(−20° C.)≤0.95. This reduces temperature dependency of the coating layer, allowing the durability of the transponder to be effectively improved in a low temperature environment.

In the pneumatic tire of the second or third embodiments, preferably, the transponder is covered with the coating layer, and a storage modulus E'c(20° C.) at 20° C. of the coating layer and a storage modulus E'a(20° C.) at 20° C. of the rubber member adjacent to the outer side of the coating layer in the tire width direction satisfy a relationship 0.1≤E'c(20° C.)/E'a(20° C.)≤1.5. This makes the physical properties of the coating layer close to those of the rubber member adjacent to the coating layer, enabling a stress distribution effect during traveling to be obtained and the durability of the transponder to be effectively improved.

In the pneumatic tire of the second or third embodiments, preferably, the transponder is covered with the coating layer, and a storage modulus E'c(60° C.) at 60° C. of the coating layer and a storage modulus E'a(60° C.) at 60° C. of the rubber member adjacent to the outer side of the coating layer in the tire width direction satisfy a relationship 0.2≤E'c(60° C.)/E'a(60° C.)≤1.2. This makes the physical properties of the coating layer close to those of the rubber member adjacent to the coating layer, enabling a stress distribution effect during traveling to be obtained and the durability of the transponder to be effectively improved.

In the pneumatic tire of the second or third embodiments, preferably, the transponder is covered with the coating layer, and the storage modulus E'c(20° C.) at 20° C. of the coating layer is in a range from 2 MPa to 12 MPa. This allows the durability of the transponder to be effectively improved.

In the pneumatic tire of the second or third embodiments, preferably, the transponder is covered with the coating layer, and the storage modulus E'c(20° C.) at 20° C. of the coating layer and the storage modulus E'c(60° C.) at 60° C. of the coating layer satisfy a relationship 1.0≤E'c(20° C.)/E'c(60° C.)≤1.5. This reduces the temperature dependency of the coating layer, thus even in a case where the temperature of the tire rises at high speeds, and the coating layer is prevented from being softened, allowing the durability of the transponder to be effectively improved.

In the pneumatic tire of the third embodiment, preferably, the rubber member having the largest storage modulus at 20° C. of the rubber members located on the outer side of the transponder in the tire width direction has a tan δout(60° C.) at 60° C. in a range from 0.05 to 0.30, and the rubber member having the largest storage modulus at 20° C. of the rubber members located on the inner side of the transponder in the tire width direction has a tan δin(60° C.) at 60° C. in a range from 0.05 to 0.30. This allows heat build-up during traveling to be suppressed while properly maintaining responsiveness to tire deformation and ensuring a buffering effect produced by a response delay. As a result, the durability of the transponder can be effectively improved.

In the pneumatic tire of the third embodiment, preferably, an absolute value |tan δout(60° C.)−tan δin(60° C.)| of a difference between the tan δout(60° C.) and the tan δin(60° C.) is 0.2 or less. This reduces the difference in responsiveness between the rubber members located inside and outside the transponder and having the maximum storage modulus, allowing appropriately equivalent responsiveness to tire deformation to be ensured. Thus, the protection effect on the transponder can be improved. As a result, the durability of the transponder can be effectively improved.

In the pneumatic tire of the third embodiment, preferably, the rubber member having the largest storage modulus at 20° C. of the rubber members located on the outer side of the transponder in the tire width direction has a tan δout(20° C.) at 20° C. and a tan δout(100° C.) at 100° C. that satisfy a relationship 0.8≤tan δout(20° C.)/tan δout(100° C.)≤2.5, and the rubber member having the largest storage modulus at 20° C. of the rubber members located on the inner side of the transponder in the tire width direction has a tan δin(20° C.) at 20° C. and a tan δin(100° C.) at 100° C. that satisfy a relationship 0.8≤tan δin(20° C.)/tan δin(100° C.)≤2.5. This enables heat build-up to be suppressed both under normal travel conditions and at high speeds, allowing the durability of the transponder to be effectively improved.

In the pneumatic tire of the first, second or third embodiments, preferably, the transponder is covered with the coating layer, and the coating layer has a relative dielectric constant of 7 or less. Accordingly, the transponder is protected by the coating layer, allowing the durability of the transponder to be improved and also ensuring radio wave transmittivity of the transponder to allow the communication performance of the transponder to be effectively improved.

Preferably, the transponder is covered with the coating layer, and the coating layer is made of rubber or elastomer and 20 phr or more of white filler. This allows the relative dielectric constant of the coating layer to be lowered compared to that of the coating layer containing carbon, allowing the communication performance of the transponder to be effectively improved.

The white filler preferably contains from 20 phr to 55 phr of calcium carbonate. This allows the relative dielectric constant of the coating layer to be set a relatively low value, allowing the communication performance of the transponder to be effectively improved.

The center of the transponder is preferably disposed 10 mm or more away from a splice portion of a tire component in the tire circumferential direction. Accordingly, tire durability can be effectively improved.

The transponder is preferably disposed between a position of 15 mm outer side of an upper end of a bead core of a bead portion in the tire radial direction and a tire maximum width position. Accordingly, the transponder is disposed in a region having a reduced stress amplitude during traveling, thus allowing the durability of the transponder to be effectively improved and further preventing the durability of the tire from being degraded.

Preferably, a distance between a cross-sectional center of the transponder and a tire outer surface is 2 mm or more. Accordingly, tire durability can be effectively improved, and tire scratch resistance can be improved.

Preferably, the transponder is covered with a coating layer, and the coating layer has a thickness of from 0.5 mm to 3.0 mm. Accordingly, the communication performance of the transponder can be effectively improved without making the tire outer surface uneven.

Preferably, the transponder includes an IC (integrated circuit) substrate configured to store data and an antenna configured to transmit and receive data, and the antenna has a helical shape. This allows the transponder to follow the deformation of the tire during traveling, allowing the durability of the transponder to be improved.

In the first, second or third embodiments, the storage modulus E' and the loss tangent tan δ are measured using a viscoelasticity spectrometer in a tensile deformation mode at specified temperatures, a frequency of 10 Hz, an initial strain of 10%, and a dynamic strain of ±2% in accordance with JIS (Japanese Industrial Standard)-K6394. Also, a 50% deformation modulus is a tensile stress at 50% elongation measured using type 3 dumbbell-shaped test pieces at specified temperatures and a tensile speed of 500 mm/min in accordance with JIS-K6251. However, in a case where no type 3 dumbbell-shaped test pieces can be sampled from the tire, test pieces having a different shape may be used.

DETAILED DESCRIPTION

A configuration of a first embodiment will be described in detail below with reference to the accompanying drawings. FIGS. 1 to 4 illustrate a pneumatic tire according to an embodiment of the present technology.

Figure 1:
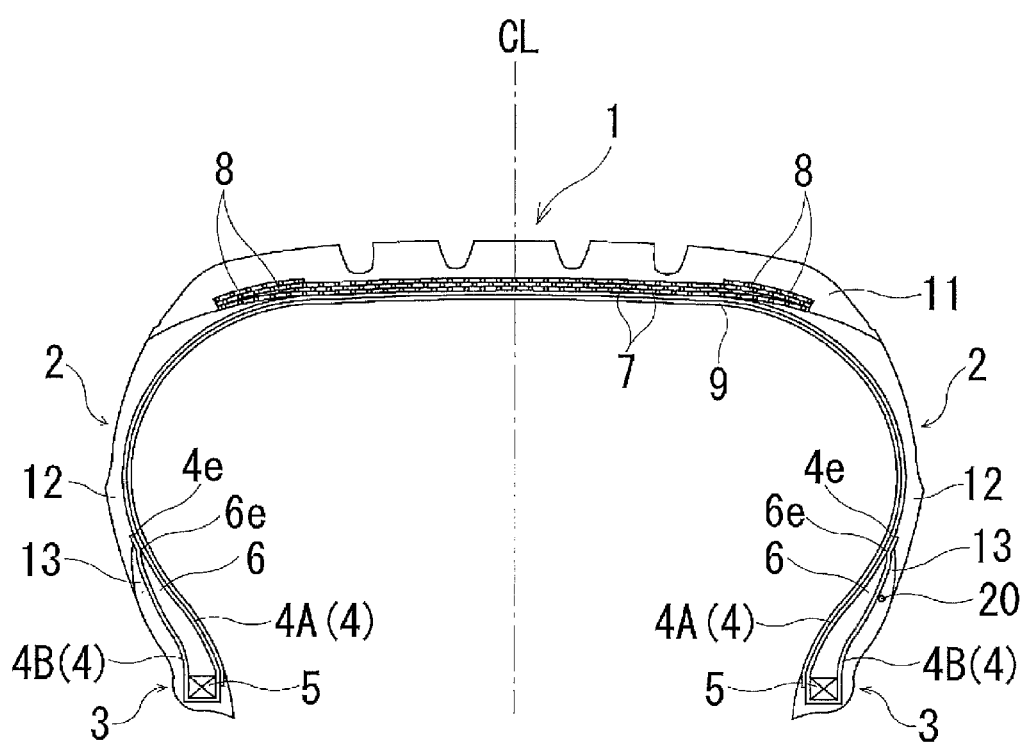
FIG. 1 is a meridian cross-sectional view illustrating the pneumatic tire according to an embodiment of the present technology.
Figure 2:
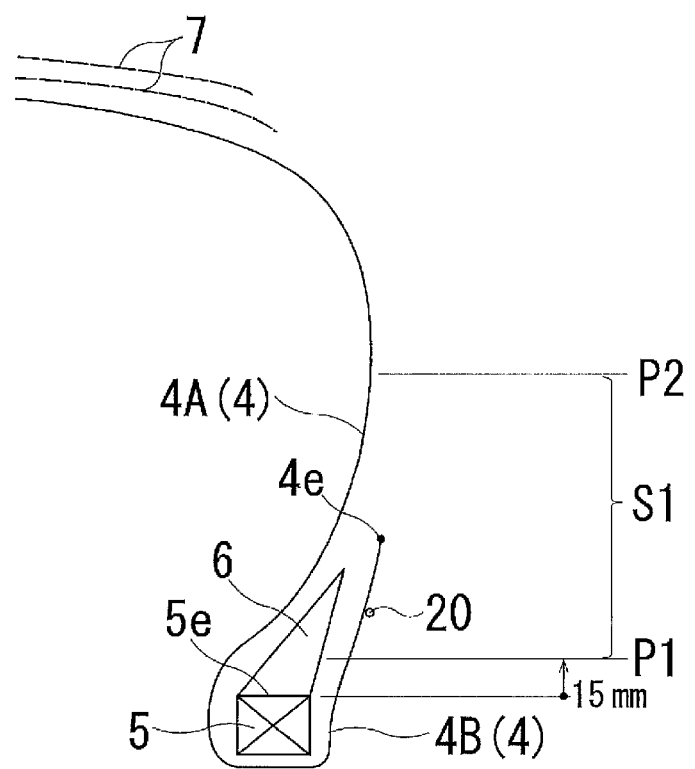
FIG. 2 is a meridian cross-sectional view schematically illustrating the pneumatic tire of FIG. 1.

As illustrated in FIG. 1, the pneumatic tire according to the present embodiment includes a tread portion 1 extending in a tire circumferential direction and having an annular shape, a pair of sidewall portions 2 disposed on both sides of the tread portion 1, and a pair of bead portions 3 disposed on an inner side in a tire radial direction of the pair of sidewall portions 2.

At least one carcass layer 4 (one layer in FIG. 1) formed by arranging a plurality of carcass cords in the radial direction is mounted between the pair of bead portions 3. The carcass layer 4 is covered with rubber. Organic fiber cords of nylon, polyester, or the like are preferably used as the carcass cords constituting the carcass layer 4. Bead cores 5 having an annular shape are embedded within the bead portions 3, and bead fillers 6 made of a rubber composition and having a triangular cross-section are disposed on the outer peripheries of the bead cores 5.

On the other hand, a plurality of belt layers 7 (two layers in FIG. 1) are embedded on a tire outer circumferential side of the carcass layer 4 of the tread portion 1. The belt layers 7 include a plurality of reinforcing cords that are inclined with respect to the tire circumferential direction, and the reinforcing cords are disposed between layers so as to intersect each other. In the belt layers 7, the inclination angle of the reinforcing cords with respect to the tire circumferential direction is set to fall within a range of from 10° to 40°, for example. Steel cords are preferably used as the reinforcing cords of the belt layers 7.

To improve high-speed durability, at least one belt cover layer 8 (two layers in FIG. 1) formed by arranging reinforcing cords at an angle of, for example, 5° or less with respect to the tire circumferential direction is disposed on a tire outer circumferential side of the belt layers 7. In FIG. 1, the belt cover layer 8 located on the inner side in the tire radial direction constitutes a full cover that covers the entire width of the belt layers 7, and the belt cover layer 8 located on an outer side in the tire radial direction constitutes an edge cover layer that covers only end portions of the belt layers 7. Organic fiber cords such as nylon and aramid are preferably used as the reinforcing cords of the belt cover layer 8.

In the pneumatic tire described above, both ends 4e of the carcass layer 4 are folded back from the tire inner side to the tire outer side around the bead cores 5 and are disposed wrapping around the bead cores 5 and the bead fillers 6. The carcass layer 4 includes: a body portion 4A corresponding to a portion extending from the tread portion 1 through each of the sidewall portions 2 to each of the bead portions 3; and a turned up portion 4B corresponding to a portion turned up around the bead core 5 at each of the bead portions 3 and extending toward each sidewall portion 2 side.

Additionally, on a tire inner surface, an innerliner layer 9 is disposed along the carcass layer 4. Furthermore, a cap tread rubber layer 11 is disposed in the tread portion 1, a sidewall rubber layer 12 is disposed in the sidewall portion 2, and a rim cushion rubber layer 13 is disposed in the bead portion 3.

Additionally, in the pneumatic tire described above, the transponder 20 is embedded in a portion located on the outer side of the carcass layer 4 in the tire width direction. The transponder 20 extends along the tire circumferential direction. The transponder 20 may be disposed inclined at an angle ranging from −10° to 10° with respect to the tire circumferential direction.

Figure 5A:
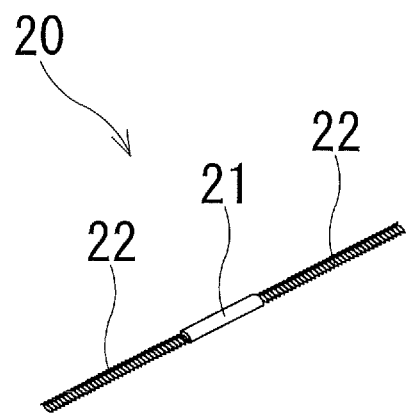
FIGS. 5A and 5B are perspective views illustrating a transponder that can be embedded in a pneumatic tire according to an embodiment of the present technology.
Figure 5B:
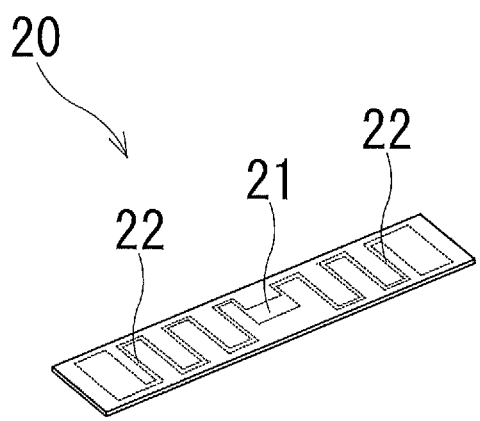

As the transponder 20, for example, a radio frequency identification (RFID) tag can be used. As illustrated in FIGS. 5A and 5B, the transponder 20 includes an IC substrate 21 that stores data and an antenna 22 that transmits and receives data in a non-contact manner. By using the transponder 20 as described above to write or read information related to the tire on a timely basis, the tire can be efficiently managed. Note that "RFID" refers to an automatic recognition technology including: a reader/writer including an antenna and a controller; and an ID tag including an IC substrate and an antenna, the automatic recognition technology allowing data to be communicated in a wireless manner.

The overall shape of the transponder 20 is not particularly limited, and for example, a pillar- or plate-like shape can be used as illustrated in FIGS. 5A and 5B. In particular, using the transponder 20 having a pillar-like shape illustrated in FIG. 5A is suitable as it can follow the deformation of the tire in each direction. In this case, the antenna 22 of the transponder 20 projects from each of both end portions of the IC substrate 21 and exhibits a helical shape. This allows the transponder 20 to follow the deformation of the tire during traveling, allowing the durability of the transponder 20 to be improved. Additionally, by appropriately changing the length of the antenna 22, the communication performance can be ensured.

Furthermore, in the pneumatic tire described above, the rubber member having the largest storage modulus E'out (20° C.) at 20° C. (hereinafter also referred to as the outer member) of the rubber members located on the outer side of the transponder 20 in the tire width direction (the sidewall rubber layer 12 and the rim cushion rubber layer 13 in FIG. 1) corresponds to the rim cushion rubber layer 13. On the other hand, the rubber member having the largest storage modulus E'in(20° C.) at 20° C. (hereinafter also referred to as the inner member) of the rubber members located on the inner side of the transponder 20 in the tire width direction (the coating rubber of the carcass layer 4, the bead filler 6, and the innerliner layer 9 in FIG. 1) corresponds to the bead filler 6. Note that the rubber member (outer member or inner member) having the largest storage modulus at 20° C. does not include the coating layer 23 covering the transponder 20 described below.

In a region located on the inner side of the vertex of the bead filler 6 in the tire radial direction, the storage modulus E'out(20° C.) at 20° C. of the outer member can be set in the range from 8 MPa to 12 MPa, and the storage modulus E'in(20° C.) at 20° C. of the inner member can be set in the range from 9 MPa to 120 MPa. In addition, in a flex zone located on the outer side of the vertex of the bead filler 6 in the tire radial direction, the storage modulus E'out(20° C.) at 20° C. of the outer member can be set in the range of 3 MPa to 5 MPa, and the storage modulus E'in(20° C.) at 20° C. of the inner member can be set in the range from 5 MPa to 7 MPa.

Here, the modulus M50out(0° C.) during 50% deformation at 0° C. and the modulus M50out(−20° C.) during 50% deformation at −20° C. of the outer member satisfy the relationship $0.50 \leq M50out(0° C.)/M50out(−20° C.) \leq 1.00$, and the modulus M50in(0° C.) during 50% deformation at 0° C. and the modulus M50in(−20° C.) during 50% deformation at −20° C. of the inner member satisfy the relationship $0.25 \leq M50in(0° C.)/M50in(−20° C.) \leq 1.00$. In particular, preferably, the relationships $0.7 \leq M50out(0° C.)/M50out(−20° C.) \leq 0.9$ and $0.5 \leq M50in(0° C.)/M50in(−20° C.) \leq 0.9$ are satisfied.

In this case, preferably, the modulus M50out(0° C.) during 50% deformation at 0° C. of the outer member is preferably set in the range from 1.5 MPa to 5 MPa, and the modulus M50in(0° C.) during 50% deformation at 0° C. of the inner member is set in the range from 2.5 MPa to 15 MPa.

Note that in the example illustrated in the embodiment of FIG. 1, the transponder 20 is disposed between the turned up portion 4B of the carcass layer 4 and the rim cushion rubber layer 13, but no such limitation is intended. Alternatively, the transponder 20 can be disposed between the body portion 4A of the carcass layer 4 and the sidewall rubber layer 12. The outer member and the inner member vary depending on the position where the transponder 20 is disposed, but in any case, the modulus M50out(0° C.) during 50% deformation at 0° C. and the modulus M50out(−20° C.) during 50% deformation at −20° C. of the outer member and the modulus M50in(0° C.) during 50% deformation at 0° C. and the modulus M50in(−20° C.) during 50% deformation at −20° C. of the inner member are set to satisfy the relationship formula described above.

In the pneumatic tire described above, the transponder 20 is embedded in the outer side of the carcass layer 4 in the tire width direction, and thus no tire components block radio waves during communication of the transponder 20, allowing the communication performance of the transponder 20 to be ensured. In addition, the rubber member having the largest storage modulus at 20° C. of the rubber members located on the outer side of the transponder 20 in the tire width direction has a modulus M50out(0° C.) during 50% deformation at 0° C. and a modulus M50out(−20° C.) during 50% deformation at −20° C. that satisfy the relationship $0.50 \leq M50out(0° C.)<M50out(20° C.)<1.00$, and the rubber member having the largest storage modulus at 20° C. of the rubber members located on the inner side of the transponder 20 in the tire width direction has a modulus M50in(0° C.) during 50% deformation at 0° C. and a modulus M50in(−20° C.) during 50% deformation at −20° C. that satisfy the relationship $0.25 \leq M50in(0° C.)<M50in(20° C.)<1.00$. This allows embrittlement of hard rubber members located inside and outside the transponder 20 can be avoided in a low temperature environment and stress concentration during the tire deformation to be suppressed. This can provide the improved durability while ensuring the durability of the transponder 20.

Here, when the value of M50out(0° C.)/M50out(−20° C.) or M50in(0° C.)/M50in(−20° C.) is less than a lower limit value, stress concentration occurs in the rubber member located on the inner side or on the outer side of the transponder 20 during tire deformation, degrading the durability of the transponder 20 in the low temperature environment. In contrast, when the value of M50out(0° C.)/M50out (−20° C.) or M50in(0° C.)/M50in(−20° C.) is larger than an upper limit value, there is a low rate of change between the modulus during 50% deformation at 0° C. and the modulus during 50% deformation at −20° C., and the rubber members are brittle, leading to degraded durability of the tire.

Note that a lower temperature dependency of physical properties of the outer member indicates a higher protection effect on the transponder 20 against tire deformation during traveling, which is preferable. Thus, preferably, the relationship M50out(0° C.)/M50out(−20° C.)>50in(0° C.)/M50in(−20° C.) is satisfied, and the relationship 1.1×M50in(0° C.)/M50in(−20° C.)≤M50out(0° C.)/M50out(−20° C.)≤1.3× M50in(0° C.)/M50in(−20° C.) is satisfied.

In the pneumatic tire described above, the transponder 20 is preferably disposed between a position P1 located 15 mm on the outer side of an upper end 5e of the bead core 5 (an end portion on the outer side in the tire radial direction) and a position P2 corresponding to the tire maximum width as an arrangement region in the tire radial direction. In other words, the transponder 20 is preferably disposed in a region S1 illustrated in FIG. 2. In a case where the transponder 20 is disposed in the region S1, the transponder 20 is positioned in a region subjected to a low stress amplitude during traveling, thus allowing the durability of the transponder 20 to be effectively improved, and further preventing the durability of the tire from being degraded. In this regard, in a case where the transponder 20 is disposed on the inner side of the position P1 in the tire radial direction, the transponder 20 is brought close to a metal member such as the bead core 5 and thus is tend to have degraded communication performance. On the other hand, in a case where the transponder 20 is disposed on the outer side of the position P2 in the tire radial direction, the transponder 20 is positioned in a region having a larger stress amplitude during traveling, leading to a high likelihood of damage to the transponder 20 itself and of an interfacial failure around the transponder 20. This is not preferable.

Figure 3:
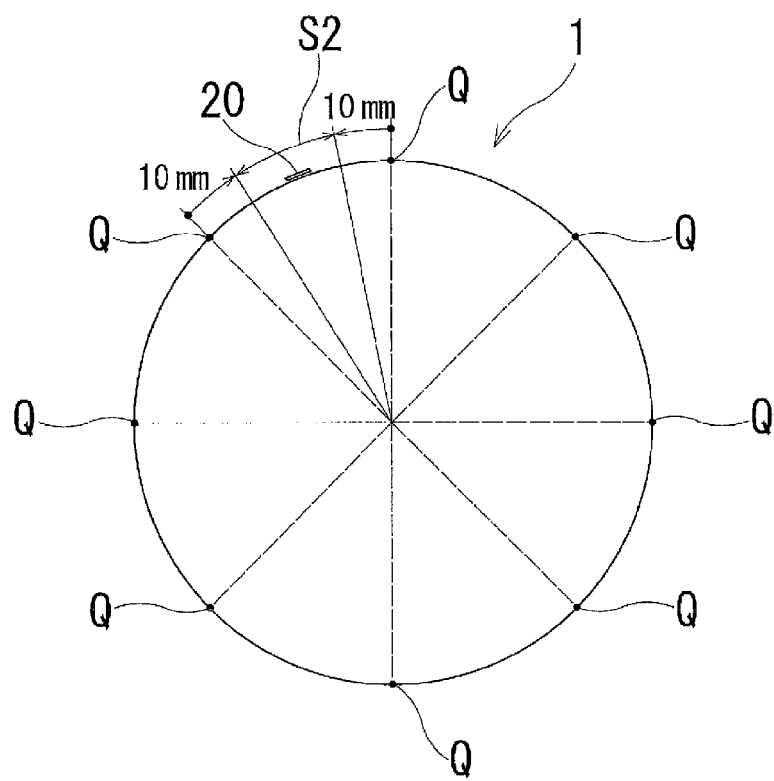
FIG. 3 is an equatorial cross-sectional view schematically illustrating the pneumatic tire of FIG. 1.

As illustrated in FIG. 3, a plurality of splice portions formed by overlaying end portions of the tire component are present on the tire circumference. FIG. 3 illustrates positions Q of each of the splice portions in the tire circumferential direction. The center of the transponder 20 is preferably disposed 10 mm or more away from the splice portion of the tire component in the tire circumferential direction. In other words, the transponder 20 is preferably disposed in a region S2 illustrated in FIG. 3. Specifically, the IC substrate 21 constituting the transponder 20 is preferably located 10 mm or more away from the position Q in the tire circumferential direction. Furthermore, the entire transponder 20 including the antenna 22 is more preferably located 10 mm or more away from the position Q in the tire circumferential direction, and the entire transponder 20 covered with the coating rubber is most preferably located 10 mm or more away from the position Q in the tire circumferential direction. Additionally, the tire component disposed away from the transponder 20 is preferably the sidewall rubber layer 12 or the rim cushion rubber layer 13, or the carcass layer 4, which are disposed adjacent to the transponder 20. By disposing the transponder 20 away from the splice portion of the tire component as described above, tire durability can be effectively improved.

Note that in the embodiment of FIG. 3, an example in which the positions Q of the splice portions of each tire component in the tire circumferential direction are disposed at equal intervals, but no such limitation is intended. The position Q in the tire circumferential direction can be set at any position, and in either case, the transponder 20 is disposed 10 mm or more away from the splice portion of each tire component in the tire circumferential direction.

Figure 4:
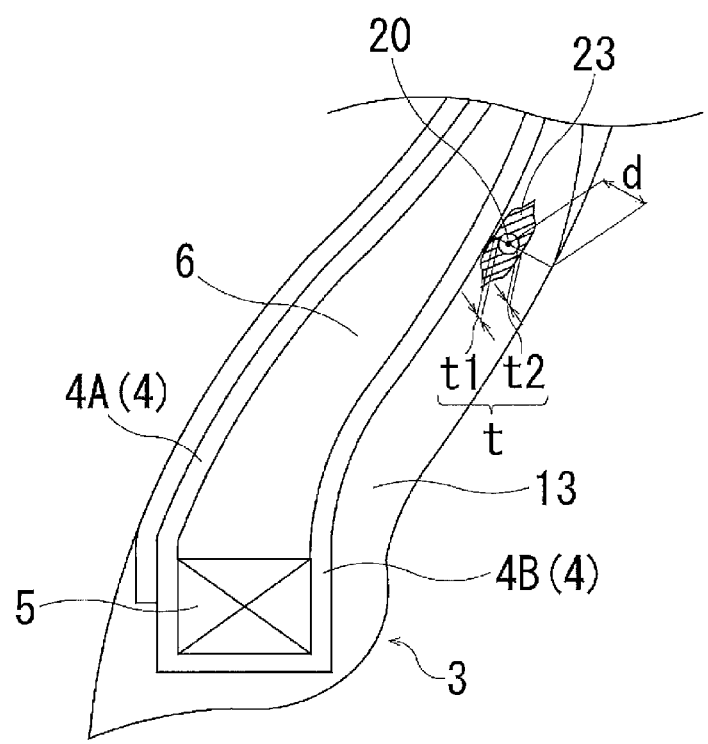
FIG. 4 is an enlarged cross-sectional view illustrating a transponder embedded in the pneumatic tire of FIG. 1.

As illustrated in FIG. 4, a distance d between the cross-sectional center of the transponder 20 and the tire outer surface is preferably 2 mm or more. By spacing the transponder 20 and the tire outer surface apart from each other as described above, tire durability can be effectively improved, and tire scratch resistance can be improved.

Additionally, the transponder 20 is preferably covered with a coating layer 23. The coating layer 23 coats the entire transponder 20 while holding both front and rear sides of the transponder 20. The coating layer 23 may be formed from rubber having physical properties identical to those of the rubber constituting the sidewall rubber layer 12 or the rim cushion rubber layer 13 or from rubber having different physical properties. The transponder 20 is protected by the coating layer 23, thus allowing the durability of the transponder 20 to be improved.

The coating layer 23 covering the transponder 20 will be described below in detail. For the physical properties of the coating layer 23, the storage modulus E'c(−20° C.) at −20° C. of the coating layer 23 preferably ranges from 3 MPa to 17 MPa. By setting the physical properties of the coating layer 23 as described above, the durability of the transponder 20 can be effectively improved.

The storage modulus E'c(0° C.) at 0° C. of the coating layer 23 and the storage modulus E'c(−20° C.) at −20° C. of the coating layer 23 preferably satisfy the relationship 0.50≤E'c(0° C.)/E'c(−20° C.)≤0.95. By setting the physical properties of the coating layer 23 as described above, the temperature dependency of the coating layer 23 is reduced (the coating layer 23 is less likely to generate heat), allowing the durability of the transponder 20 to be effectively improved in the low temperature environment. Here, when the value of E'c(0° C.)/E'c(−20° C.) is smaller than the lower limit value, there is a high rate of change between the storage modulus at 0° C. and the storage modulus at −20° C., and thus the rigidity on the high temperature side of the coating layer 23 decreases, leading to a degraded protection effect of the coating layer 23 on the transponder 20. On the other hand, when the value of E'c(0° C.)/E'c(−20° C.) is larger than the upper limit value, there is an excessively low rate of change between the storage modulus at 0° C. and the storage modulus at −20° C., and thus in a case where the tire generates heat, the rigidity of the coating layer 23 is higher than that of the surrounding rubber members. The coating layer 23 is likely to be broken, degrading the protection effect of the coating layer 23 on the transponder 20.

Additionally, the storage modulus E'c(0° C.) at 0° C. of the coating layer 23 and the storage modulus E'a(0° C.) at 0° C. of the rubber member (the rim cushion rubber layer 13 in FIG. 4) adjacent to the outer side of the coating layer 23 in the tire width direction preferably satisfy the relationship 0.15≤E'c(0° C.)/E'a(0° C.)≤1.30. Setting the physical properties of the coating layer 23 and the rubber member adjacent to the coating layer 23 as described above brings the physical properties of both closer, allowing a stress distribution effect during traveling to be obtained and the durability of the transponder 20 to be effectively improved in the low temperature environment.

The storage modulus $E'c(-20°\ C.)$ at $-20°$ C. of the coating layer 23 and the storage modulus $E'a(-20°\ C.)$ at $-20°$ C. of the rubber member adjacent to the outer side of the coating layer 23 in the tire width direction preferably satisfy the relationship $0.15 \leq E'c(-20°\ C.)/E'a(-20°\ C.) \leq 1.30$. Setting the physical properties of the coating layer 23 and the rubber member adjacent to the coating layer 23 as described above brings the physical properties of both closer, allowing the stress distribution effect during traveling to be obtained and the durability of the transponder 20 to be effectively improved in the low temperature environment.

As the composition of the coating layer 23, the coating layer 23 is preferably made of rubber or elastomer and 20 phr or more of white filler. The relative dielectric constant can be set relatively lower for the coating layer 23 configured as described above than for the coating layer 23 containing carbon, allowing the communication performance of the transponder 20 to be effectively improved. Note that "phr" as used herein means parts by weight per 100 parts by weight of the rubber component (elastomer).

The white filler constituting the coating layer 23 preferably includes from 20 phr to 55 phr of calcium carbonate. This enables a relatively low relative dielectric constant to be set for the coating layer 23, allowing the communication performance of the transponder 20 to be effectively improved. However, the white filler with an excessive amount of calcium carbonate contained is brittle, and the strength of the coating layer 23 decreases. This is not preferable. Additionally, the coating layer 23 can optionally contain, in addition to calcium carbonate, 20 phr or less of silica (white filler) or 5 phr or less of carbon black. In a case where a small amount of silica or carbon black is used with the coating layer 23, the relative dielectric constant of the coating layer 23 can be reduced while ensuring the strength of the coating layer 23.

In addition, the coating layer 23 preferably has a relative dielectric constant of 7 or less and more preferably from 2 to 5. By properly setting the relative dielectric constant of the coating layer 23 as described above, radio wave transmittivity can be ensured during emission of a radio wave by the transponder 20, effectively improving the communication performance of the transponder 20. Note that the rubber constituting the coating layer 23 has a relative dielectric constant of from 860 MHz to 960 MHz at ambient temperature. In this regard, the ambient temperature is $23 \pm 2°$ C. and $60\% \pm 5\%$ RH in accordance with the standard conditions of the JIS standard. The relative dielectric constant of the rubber is measured by the capacitance method after the rubber is treated at $23°$ C. and 60% RH for 24 hours. The range from 860 MHz to 960 MHz described above corresponds to currently allocated frequencies of the RFID in a UHF (ultrahigh frequency) band, but in a case where the allocated frequencies are changed, the relative dielectric constant in the range of the allocated frequencies may be specified as described above.

The coating layer 23 preferably has a thickness of from 0.5 mm to 3.0 mm and more preferably from 1.0 mm to 2.5 mm. In this regard, the thickness t of the coating layer 23 is a rubber thickness at a position where the transponder 20 is included, and is, for example, a rubber thickness obtained by summing a thickness t1 and a thickness t2 on a straight line extending through the center of the transponder 20 and orthogonally to the tire outer surface as illustrated in FIG. 4.

By properly setting the thickness t of the coating layer 23 as described above, the communication performance of the transponder 20 can be effectively improved without making the tire outer surface uneven. In this regard, when the thickness t of the coating layer 23 is less than 0.5 mm, the effect of improving the communication performance of the transponder 20 fails to be obtained. In contrast, when the thickness t of the coating layer 23 exceeds 3.0 mm, the tire outer surface is uneven, and this is not preferable for appearance. Note that the cross-sectional shape of the coating layer 23 is not particularly limited and that for example, a triangular shape, a rectangular shape, a trapezoidal shape, and a spindle shape can be adopted. The coating layer 23 in FIG. 4 has a substantially spindle-shaped cross-sectional shape.

In the example illustrated in the embodiment described above, the end 4e of the turned-up portion 4B of the carcass layer 4 is disposed close to the upper end 6e of the bead filler 6. However, no such limitation is intended, and the end 4e of the turned up portion 4B of the carcass layer 4 can be disposed at any height.

Now, a configuration according to the second embodiment will be described. The pneumatic tire according to the second embodiment has a tire structure as illustrated in FIGS. 1 to 5B, as is the case with the first embodiment.

In the pneumatic tire configured as described above, the rubber member having the largest storage modulus $E'out(20°\ C.)$ at $20°$ C. (hereinafter also referred to as the outer member) of the rubber members located on the outer side of the transponder 20 in the tire width direction (the sidewall rubber layer 12 and the rim cushion rubber layer 13 in FIG. 1) corresponds to the rim cushion rubber layer 13. On the other hand, the rubber member having the largest storage modulus $E'in(20°\ C.)$ at $20°$ C. (hereinafter also referred to as the inner member) of the rubber members located on the inner side of the transponder 20 in the tire width direction (the coating rubber of the carcass layer 4, the bead filler 6, and the innerliner layer 9 in FIG. 1) corresponds to the bead filler 6. Note that the rubber member (outer member or inner member) having the largest storage modulus at $20°$ C. does not include the coating layer 23 covering the transponder 20 described below.

Here, the modulus $M50out(20°\ C.)$ during 50% deformation at $20°$ C. and the modulus $M50out(100°\ C.)$ during 50% deformation at $100°$ C. of the outer member satisfy the relationship $1.0 < M50out(20°\ C.)/M50out(100°\ C.) \leq 2.5$, and the modulus $M50in(20°\ C.)$ during 50% deformation at $20°$ C. and the modulus $M50in(100°\ C.)$ during 50% deformation at $100°$ C. of the inner member satisfy the relationship $1.0 < M50in(20°\ C.)/M50in(100°\ C.) \leq 4.0$. In particular, the relationship $1.0 < M50out(20°\ C.)/M50out(100°\ C.) \leq 1.6$ and $1.1 \leq M50in(20°\ C.)/M50in(100°\ C.) \leq 2.5$ is preferably satisfied.

In this case, preferably, the modulus $M50out(20°\ C.)$ during 50% deformation at $20°$ C. of the outer member is set in the range from 1 MPa to 4 MPa, and the modulus $M50in(20°\ C.)$ during 50% deformation at $20°$ C. of the inner member is set in the range from 2 MPa to 13 MPa.

Note that in the example illustrated in the embodiment of FIG. 1, the transponder 20 is disposed between the turned up portion 4B of the carcass layer 4 and the rim cushion rubber layer 13, but no such limitation is intended. Alternatively, the transponder 20 can be disposed between the body portion 4A of the carcass layer 4 and the sidewall rubber layer 12. The outer member and the inner member vary depending on the position where the transponder 20 is disposed, but in any case, the modulus $M50out(20°\ C.)$ during 50% deformation at 20° C. and the modulus M50out (100° C.) during 50% deformation at 100° C. of the outer member and the modulus M50in(20° C.) during 50% deformation at 20° C. and the modulus M50in(100° C.) during 50% deformation at 100° C. of the inner member are set to satisfy the relationship formula described above.

In the pneumatic tire described above, the transponder 20 is embedded in the outer side of the carcass layer 4 in the tire width direction, and thus no tire components block radio waves during communication of the transponder 20, allowing the communication performance of the transponder 20 to be ensured. In addition, the rubber member having the largest storage modulus at 20° C. of the rubber members located on the outer side of the transponder 20 in the tire width direction has a modulus M50out(20° C.) during 50% deformation at 20° C. and a modulus M50out(100° C.) during 50% deformation at 100° C. that satisfy the relationship 1.0≤M50out(20° C.)<M50out(100° C.)<2.5, and the rubber member having the largest storage modulus at 20° C. of the rubber members located on the outer side of the transponder 20 in the tire width direction has a modulus M50in(20° C.) during 50% deformation at 20° C. and a modulus M50in(100° C.) during 50% deformation at 100° C. that satisfy the relationship 1.0≤M50in(20° C.)<M50in (100° C.)<4.0. This allows for suppressing softening of the hard rubber members located inside and outside the transponder 20 and ensuring a protection effect on the transponder 20 even in a case where the tire is at high temperature as well as suppressing stress concentration during tire deformation. This can provide the improved durability while ensuring the durability of the transponder 20.

Here, when the value of M50out(20° C.)/M50out(100° C.) or M50in(20° C.)/M50in(100° C.) is smaller than the lower limit value, the value of M50out(100° C.) or M50in (100° C.) increases, and thus the tire deforms to cause stress concentration in the rubber member located on the inner side or the outer side of the transponder 20, making the tire likely to be broken. In contrast, when the value of M50out(20° C.)/M50out(100° C.) or M50in(20° C.)/M50in(100° C.) is larger than the upper limit value, there is an increase in the rate of decrease in 50% deformation modulus, which is associated with an increase in temperature, and thus an increased temperature of the tire significantly softens the rubber member located on the inner side or the outer side of the transponder 20. This degrades the protection effect on the transponder 20 to degrade the durability of the transponder 20.

Note that a lower temperature dependency of physical properties of the outer member indicates a higher protection effect on the transponder 20 against tire deformation during traveling, which is preferable. Thus, preferably, the relationship M50out(20° C.)/M50out(100° C.)<M50in(20° C.)/ M50in(100° C.) is satisfied, and further the relationship 0.7×M50in(20° C.)/M50in(100° C.)≤M50out(20° C.)/ M50out(100° C.)≤0.9×M50in(20° C.)/M50in(100° C.) is satisfied.

For the physical properties of the coating layer 23, the storage modulus E'c(20° C.) at 20° C. of the coating layer 23 preferably ranges from 2 MPa to 12 MPa. By setting the physical properties of the coating layer 23 as described above, the durability of the transponder 20 can be effectively improved.

The storage modulus E'c(20° C.) at 20° C. of the coating layer 23 and the storage modulus E'c(60° C.) at 60° C. of the coating layer 23 preferably satisfy the relationship 1.0≤E'c (20° C.)/E'c(60° C.)≤1.5. By setting the physical properties of the coating layer 23 as described above, the temperature dependency of the coating layer 23 is reduced (the coating layer 23 is less likely to generate heat), and thus even in a case where the temperature of the tire rises at high speeds, the coating layer 23 is prevented from being softened. This allows the durability of the transponder 20 to be effectively improved.

Additionally, the storage modulus E'c(20° C.) at 20° C. of the coating layer 23 and storage modulus E'a(20° C.) at 20° C. of the rubber member adjacent to the outer side of the coating layer 23 in the tire width direction (the rim cushion rubber layer 13 in FIG. 4) preferably satisfy the relationship 0.1≤E'c(20° C.)/E'a(20° C.)≤1.5, and more preferably satisfy the relationship 0.15≤E'c(20° C.)/E'a(20° C.)≤1.30. Setting the physical properties of the coating layer 23 and the rubber member adjacent to the coating layer 23 as described above brings the physical properties of both closer, allowing the stress distribution effect during traveling to be obtained and the durability of the transponder 20 to be effectively improved.

The storage modulus E'c(60° C.) at 60° C. of the coating layer 23 and the storage modulus E'a(60° C.) at 60° C. of the rubber member adjacent to the outer side of the coating layer 23 in the tire width direction preferably satisfy the relationship 0.2≤E'c(60° C.)/E'a(60° C.)≤1.2. Setting the physical properties of the coating layer 23 and the rubber member adjacent to the coating layer 23 as described above brings the physical properties of both closer, allowing the stress distribution effect during traveling to be obtained and the durability of the transponder 20 to be effectively improved.

Now, a configuration according to the third embodiment will be described. The pneumatic tire according to the third embodiment has a tire structure as illustrated in FIGS. 1 to 5B, as is the case with the first embodiment.

In the pneumatic tire configured as described above, the rubber member having the largest storage modulus at 20° C. (hereinafter also referred to as the outer member) of the rubber members located on the outer side of the transponder 20 in the tire width direction (the sidewall rubber layer 12 and the rim cushion rubber layer 13 in FIG. 1) corresponds to the rim cushion rubber layer 13. On the other hand, the rubber member having the largest storage modulus at 20° C. (hereinafter also referred to as the inner member) of the rubber members located on the inner side of the transponder 20 in the tire width direction (the coating rubber of the carcass layer 4, the bead filler 6, and the innerliner layer 9 in FIG. 1) corresponds to the bead filler 6. Note that the rubber member (outer member or inner member) having the largest storage modulus at 20° C. does not include the coating layer 23 covering the transponder 20 described below.

Here, the absolute value |M50out(50° C.)−M50in(50° C.)| of the difference between the modulus M50out(50° C.) during 50% deformation at 50° C. of the outer member and the modulus M50in(50° C.) during 50% deformation at 50° C. of the inner member are set to 10 MPa or less. In particular, |M50out(50° C.)−M50in(50° C.)| is preferably 5 MPa or less.

In this case, preferably, the modulus M50out(50° C.) during 50% deformation at 50° C. of the outer member is set in the range from 1 MPa to 4 MPa, and the modulus M50in(50° C.) during 50% deformation at 50° C. of the inner member is set in the range from 1 MPa to 12 MPa.

Note that in the example illustrated in the embodiment of FIG. 1, the transponder 20 is disposed between the turned up portion 4B of the carcass layer 4 and the rim cushion rubber layer 13, but no such limitation is intended. Alternatively, the transponder 20 can be disposed between the body portion 4A of the carcass layer 4 and the sidewall rubber layer 12. Although the outer member and the inner member vary depending on the position where the transponder 20 is disposed, in any case, the absolute value |M50out(50° C.)−M50in(50° C.)| of the difference between the modulus M50out(50° C.) during 50% deformation at 50° C. of the outer member and the modulus M50in(50° C.) during 50% deformation at 50° C. of the inner member is set as described above.

In the pneumatic tire described above, the transponder 20 is embedded in the outer side of the carcass layer 4 in the tire width direction, and thus no tire components block radio waves during communication of the transponder 20, allowing the communication performance of the transponder 20 to be ensured. Additionally, 10 MPa or less is set for the absolute value |M50out(50° C.)−M50in(50° C.)| of the difference between the modulus M50out(50° C.) during 50% deformation at 50° C. of the rubber member having the largest storage modulus at 20° C. of the rubber members located on the outer side of the transponder 20 in the tire width direction and the modulus M50in(50° C.) during 50% deformation at 50° C. of the rubber member having the largest storage modulus at 20° C. of the rubber members located on the inner side of the transponder 20 in the tire width direction. This reduces the difference in the modulus during 50% deformation between the rubber members located inside and outside the transponder 20 even at high temperatures, allowing suppression of stress concentration at the surface of the transponder 20 during tire deformation. In other words, the outer member and the inner member respectively located on both sides of the transponder 20 have only a small difference in physical properties, thus enabling a reduction in stress concentration occurring at the surface of the transponder 20 on the outer side or the inner side in the tire width direction. This allows the protection effect of the transponder 20 to be improved. This can provide the improved durability of the transponder 20 while ensuring the durability of the tire.

Here, when the value |M50out(50° C.)−M50in(50° C.)| is larger than the upper limit value, the difference in modulus at 50% deformation between the outer member and the inner member increases, and thus stress concentration occurs at either the outer side and the inner side in the tire width direction of the transponder 20, and the durability of the transponder 20 is easily damaged, and the durability of the transponder 20 decreases.

Additionally, preferably, the tan δout(60° C.) at 60° C. of the outer member is in the range from 0.05 to 0.30, and the tan δin(60° C.) at 60° C. of the inner member is in the range from 0.05 to 0.30. In particular, preferably, the tan δout(60° C.) at 60° C. of the outer member ranges from 0.10 to 0.26, and the tan δin(60° C.) at 60° C. of the inner member ranges from 0.10 to 0.26. Accordingly, in the rubber members located on the inner and outer sides of the transponder 20, heat build-up during traveling can be suppressed, with responsiveness to tire deformation properly maintained and a buffering effect ensured that is produced by a response delay. As a result, the durability of the transponder 20 can be improved.

Here, when the value of the tan δout(60° C.) or the tan δin(60° C.) is smaller than the lower limit value, the responsiveness to tire deformation during traveling is excessively improved, making the transponder 20 likely to be damaged due to tire deformation during traveling. In contrast, when the value of the tan δout(60° C.) or the tan δin(60° C.) is larger than the upper limit value, the heat build-up during traveling makes a failure likely to occur in the transponder 20.

In the pneumatic tire described above, the absolute value |tan δout(60° C.)−tan δin(60° C.)| of the difference between the tan δout(60° C.) of the outer member and the tan δin(60° C.) of the inner member is preferably 0.2 or less. By setting the difference in tan δ between the outer member and the inner member as described above, the difference in responsiveness between the outer member and the inner member decreases, allowing appropriately equivalent responsiveness to tire deformation to be ensured. Thus, the protection effect on the transponder 20 can be improved. As a result, the durability of the transponder 20 can be effectively improved.

Additionally, preferably, the tan δout(20° C.) at 20° C. and the tan δout(100° C.) at 100° C. of the outer member satisfy the relationship 0.8≤tan δout(20° C.)/tan δout(100° C.)≤2.5, and the tan δin(20° C.) at 20° C. and the tan δin(100° C.) at 100° C. of the inner member satisfy the relationship 0.8≤tan δin(20° C.)/tan δin(100° C.)≤2.5. The tan δ of the outer member and the inner member at the temperatures satisfies the relationship formula described above, allowing suppression of heat build-up both under normal travel conditions and at high speeds and allowing the durability of the transponder 20 to be effectively improved.

For the physical properties of the coating layer 23, the storage modulus E'c(20° C.) at 20° C. of the coating layer 23 preferably ranges from 2 MPa to 12 MPa. By setting the physical properties of the coating layer 23 as described above, the durability of the transponder 20 can be effectively improved.

The storage modulus E'c(20° C.) at 20° C. of the coating layer 23 and the storage modulus E'c(60° C.) at 60° C. of the coating layer 23 preferably satisfy the relationship 1.0≤E'c(20° C.)/E'c(60° C.)≤1.5. By setting the physical properties of the coating layer 23 as described above, the temperature dependency of the coating layer 23 is reduced (the coating layer 23 is less likely to generate heat), and thus even in a case where the temperature of the tire rises at high speeds, the coating layer 23 is prevented from being softened. This allows the durability of the transponder 20 to be effectively improved.

Additionally, the storage modulus E'c(20° C.) at 20° C. of the coating layer 23 and storage modulus E'a(20° C.) at 20° C. of the rubber member adjacent to the outer side of the coating layer 23 in the tire width direction (the rim cushion rubber layer 13 in FIG. 4) preferably satisfy the relationship 0.1≤E'c(20° C.)/E'a(20° C.)≤1.5, and more preferably satisfy the relationship 0.15≤E'c(20° C.)/E'a(20° C.)≤1.30. Setting the physical properties of the coating layer 23 and the rubber member adjacent to the coating layer 23 as described above brings the physical properties of both closer, allowing the stress distribution effect during traveling to be obtained and the durability of the transponder 20 to be effectively improved.

The storage modulus E'c(60° C.) at 60° C. of the coating layer 23 and the storage modulus E'a(60° C.) at 60° C. of the rubber member adjacent to on the outer side of the coating layer 23 in the tire width direction preferably satisfy the relationship 0.2≤E'c(60° C.)/E'a(60° C.)≤1.2. Setting the physical properties of the coating layer 23 and the rubber member adjacent to the coating layer 23 as described above brings the physical properties of both closer, allowing the stress distribution effect during traveling to be obtained and the durability of the transponder 20 to be effectively improved.

Note that in the pneumatic tire of the second or third embodiments described above, the relative dielectric constant of the coating layer 23, the position of the white filler included in the coating layer 23, the position of the transponder 20 in the tire circumferential direction, the position of the transponder 20 in the tire radial direction, the distance d between the cross-sectional center of the transponder 20 and the tire surface, the thickness of the coating layer 23, and the structure of the transponder 20 can be selected similar to those of the pneumatic tire of the first embodiment.

EXAMPLES

Pneumatic tires according to Comparative Examples 1 to 4 and according to Examples 1 to 14 were manufactured. In the pneumatic tires that have a tire size of 265/40ZR20 and include a tread portion extending in the tire circumferential direction and having an annular shape, a pair of sidewall portions respectively disposed on both sides of the tread portion, a pair of bead portions each disposed on an inner side of the pair of sidewall portions in the tire radial direction, and a carcass layer mounted between the pair of bead portions, a transponder is embedded, and the following are set as shown in Tables 1 and 2: the position of the transponder in the tire width direction, the position of the transponder in the tire radial direction, the M50out(0° C.)/M50out(−20° C.), the M50in(0° C.)/M50in(−20° C.), the presence of the coating layer, the relative dielectric constant of the coating layer, the thickness of the coating layer, the storage modulus E'c(0° C.) of the coating layer, the storage modulus E'c(−20° C.) of the coating layer, the E'c(0° C.)/E'a(0° C.), the E'c(−20° C.)/E'a(−20° C.), and the E'c(0° C.)/E'c(−20° C.).

In Comparative Examples 1 to 4 and Examples 1 to 14, a transponder having a pillar-like shape was used, and the distance from the center of the transponder to the splice portion of the tire component in the tire circumferential direction was set to 10 mm, and the distance from the cross-sectional center of the transponder to the tire outer surface was set to 2 mm or more.

Figure 6:
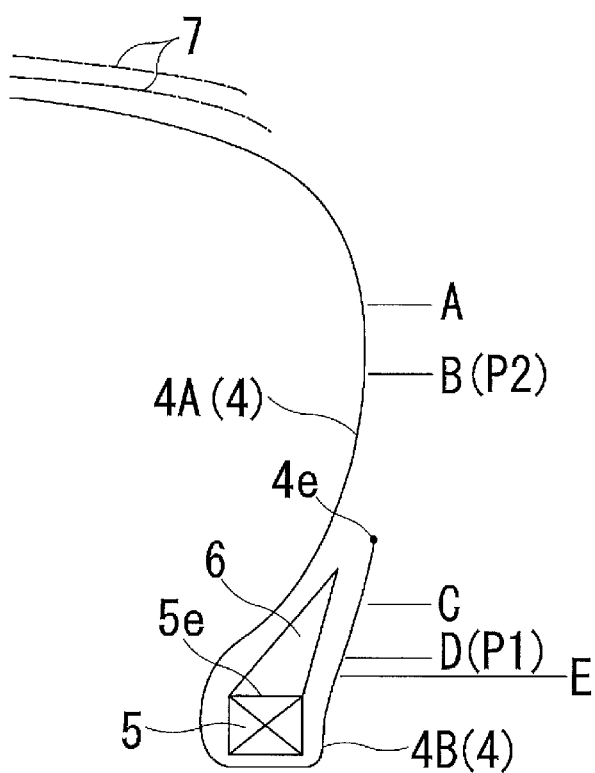
FIG. 6 is an explanatory diagram illustrating the position of a transponder in a test tire in a tire radial direction.

In Tables 1 and 2, the position of the transponder in the tire width direction represented as "Inner side" means that the transponder is disposed on the inner side of the carcass layer in the tire width direction, and the position of the transponder in the tire width direction represented as "Outer side" means that the transponder is disposed on the outer side of the carcass layer in the tire width direction. Additionally, in Tables 1 and 2, the position of the transponder in the tire radial direction corresponds to each of the positions A to E illustrated in FIG. 6.

In Comparative Examples 2 to 4 and Examples 1 to 14, the outer member is a rim cushion rubber layer, and the inner member is a bead filler. In other words, in Tables 1 and 2, "M50out(0° C.)/M50out(−20° C.)" is the ratio of the 50% deformation modulus in the rim cushion rubber layer, and "M50in(0° C.)/M50in(−20° C.)" is the ratio of the 50% deformation modulus in the bead filler, corresponding to the inner member. Additionally, "E'c(0° C.)/E'a(0° C.)" and "E'c(−20° C.)/E'a(−20° C.)" is the ratio of the storage modulus in the coating layer to the storage modulus of the rim cushion rubber layer, corresponding to the rubber member adjacent to the outer side of the coating layer in the tire width direction. "E'c(0° C.)/E'c(−20° C.)" is the ratio of the storage modulus in the coating layer. For Comparative Example 1, for convenience, the physical properties of the rim cushion rubber layer are indicated as the physical properties of the outer member, and the physical properties of the bead filler are indicated as the physical properties of the inner member.

Tire evaluation (durability) and transponder evaluation (communication performance and durability) were conducted on the test tires using a test method described below, and the results are indicated in Tables 1 and 2.

Durability (Tire and Transponder):

Each of the test tires was mounted on a wheel of a standard rim, and a traveling test was performed by using a drum testing machine at a temperature of −20° C., an air pressure of 120 kPa, a load of 102% of the maximum load, and a traveling speed of 81 km/h. The traveling distance was measured when a failure occurred in the tire. Evaluation results are expressed as index values with Comparative Example 2 being assigned an index value of 100. Larger index values indicate superior tire durability. Furthermore, after the end of traveling, each test tire was checked for the availability of communication of the transponder and for damage to the transponder. Results are expressed as three levels: "Excellent" indicates that communication is enabled and that no damage is found, "Good" indicates that communication is enabled but that damage is found, and "Poor" indicates that communication is disabled. Communication Performance (transponder):

For each test tire, a communication operation with the transponder was performed using a reader/writer. Specifically, the maximum communication distance was measured with the reader/writer at a power output of 250 mW and a carrier frequency of from 860 MHz to 960 MHz. Evaluation results are expressed as index values with Comparative Example 2 being assigned an index value of 100. Larger index values indicate superior communication performance.

TABLE 1-1

|  | Comparative Example 1 | Comparative Example 2 | Comparative Example 3 | Comparative Example 4 |
| --- | --- | --- | --- | --- |
| Position of transponder in tire width direction | Inner side | Outer side | Outer side | Outer side |
| Position of transponder in tire radial direction | C | C | C | C |
| M50out(0° C.)/M50out(−20° C.) | 0.4 | 0.4 | 0.7 | 1.0 |
| M50in(0° C.)/M50in(−20° C.) | 0.5 | 0.5 | 0.2 | 1.0 |
| Presence of coating layer | No | No | No | No |
| Relative dielectric constant of coating layer | — | — | — | — |
| Thickness of coating layer (mm) | — | — | — | — |
| Storage modulus E'c(0° C.) of coating layer [MPa] | — | — | — | — |
| Storage modulus E'c(−20° C.) of coating layer [MPa] | — | — | — | — |
| E'c(0° C.)/E'a(0° C.) | — | — | — | — |
| E'c(−20° C.)/E'a(−20° C.) | — | — | — | — |

TABLE 1-1-continued

|  | | Comparative Example 1 | Comparative Example 2 | Comparative Example 3 | Comparative Example 4 |
|---|---|---|---|---|---|
| $E'c(0°\ C.)/E'c(-20°\ C.)$ | | — | — | — | — |
| Tire evaluation | Durability | 100 | 100 | 100 | 95 |
| Transponder evaluation | Communication performance | 85 | 100 | 100 | 100 |
| | Durability | Poor | Poor | Poor | Good |

TABLE 1-2

|  | | Example 1 | Example 2 | Example 3 | Example 4 | Example 5 |
|---|---|---|---|---|---|---|
| Position of transponder in tire width direction | | Outer side | Outer side | Outer side | Outer side | Outer side |
| Position of transponder in tire radial direction | | C | E | D | B | A |
| M50out(0° C.)/M50out(−20° C.) | | 0.7 | 0.7 | 0.7 | 0.7 | 0.7 |
| M50in(0° C.)/M50in(−20° C.) | | 0.5 | 0.5 | 0.5 | 0.5 | 0.5 |
| Presence of coating layer | | No | No | No | No | No |
| Relative dielectric constant of coating layer | | — | — | — | — | — |
| Thickness of coating layer (mm) | | — | — | — | — | — |
| Storage modulus $E'c(0°\ C.)$ of coating layer [MPa] | | — | — | — | — | — |
| Storage modulus $E'c(-20°\ C.)$ of coating layer [MPa] | | — | — | — | — | — |
| $E'c(0°\ C.)/E'a(0°\ C.)$ | | — | — | — | — | — |
| $E'c(-20°\ C.)/E'a(-20°\ C.)$ | | — | — | — | — | — |
| $E'c(0°\ C.)/E'c(-20°\ C.)$ | | — | — | — | — | — |
| Tire evaluation | Durability | 105 | 105 | 105 | 105 | 103 |
| Transponder evaluation | Communication performance | 100 | 98 | 100 | 100 | 100 |
| | Durability | Good | Good | Good | Good | Good |

TABLE 2-1

|  | | Example 6 | Example 7 | Example 8 | Example 9 | Example 10 |
|---|---|---|---|---|---|---|
| Position of transponder in tire width direction | | Outer side | Outer side | Outer side | Outer side | Outer side |
| Position of transponder in tire radial direction | | C | C | C | C | C |
| M50out(0° C.)/M50out(−20° C.) | | 1.5 | 1.5 | 1.5 | 1.5 | 1.5 |
| M50in(0° C.)/M50in(−20° C.) | | 2.0 | 2.0 | 2.0 | 2.0 | 2.0 |
| Presence of coating layer | | Yes | Yes | Yes | Yes | Yes |
| Relative dielectric constant of coating layer | | 7 | 8 | 7 | 7 | 7 |
| Thickness of coating layer (mm) | | 0.2 | 0.2 | 0.5 | 1.0 | 3.0 |
| Storage modulus $E'c(0°\ C.)$ of coating layer [MPa] | | 6.0 | 6.0 | 6.0 | 6.0 | 6.0 |
| Storage modulus $E'c(-20°\ C.)$ of coating layer [MPa] | | 5.0 | 5.0 | 5.0 | 5.0 | 5.0 |
| $E'c(0°\ C.)/E'a(0°\ C.)$ | | 0.8 | 0.8 | 0.8 | 0.8 | 0.8 |
| $E'c(-20°\ C.)/E'a(-20°\ C.)$ | | 0.7 | 0.7 | 0.7 | 0.7 | 0.7 |
| $E'c(0°\ C.)/E'c(-20°\ C.)$ | | 1.2 | 1.2 | 1.2 | 1.2 | 1.2 |
| Tire evaluation | Durability | 105 | 105 | 105 | 105 | 105 |
| Transponder evaluation | Communication performance | 105 | 103 | 108 | 110 | 112 |
| | Durability | Excellent | Excellent | Excellent | Excellent | Excellent |

TABLE 2-2

|  | | Example 11 | Example 12 | Example 13 | Example 14 |
|---|---|---|---|---|---|
| Position of transponder in tire width direction | | Outer side | Outer side | Outer side | Outer side |
| Position of transponder in tire radial direction | | C | C | C | C |
| M50out(0° C.)/M50out(−20° C.) | | 1.5 | 1.5 | 1.5 | 1.5 |
| M50in(0° C.)/M50in(−20° C.) | | 2.0 | 2.0 | 2.0 | 2.0 |
| Presence of coating layer | | Yes | Yes | Yes | Yes |
| Relative dielectric constant of coating layer | | 7 | 7 | 7 | 7 |
| Thickness of coating layer (mm) | | 1.0 | 1.0 | 1.0 | 1.0 |
| Storage modulus $E'c(0°\ C.)$ of coating layer [MPa] | | 2.5 | 17.5 | 6.0 | 6.0 |
| Storage modulus $E'c(-20°\ C.)$ of coating layer [MPa] | | 6.0 | 17.5 | 5.0 | 5.0 |
| $E'c(0°\ C.)/E'a(0°\ C.)$ | | 0.8 | 0.8 | 0.1 | 1.4 |
| $E'c(-20°\ C.)/E'a(-20°\ C.)$ | | 0.7 | 0.7 | 0.1 | 1.4 |
| $E'c(0°\ C.)/E'c(-20°\ C.)$ | | 0.4 | 1.0 | 1.2 | 1.2 |

TABLE 2-2-continued

|  |  | Example 11 | Example 12 | Example 13 | Example 14 |
|---|---|---|---|---|---|
| Tire evaluation | Durability | 105 | 105 | 105 | 105 |
| Transponder evaluation | Communication performance | 110 | 110 | 110 | 110 |
|  | Durability | Good | Good | Good | Good |

Tables 1 and 2 indicate that in the pneumatic tires of Examples 1 to 14, as compared to Comparative Example 2, the durability and the communication performance and durability of the transponder were improved in a well-balanced manner.

On the other hand, in Comparative Example 1, the transponder was disposed on the inner side of the carcass layer in the tire width direction, thus degrading the communication performance of the transponder. In Comparative Examples 1 and 3, the value of M50out(0° C.)/M50out(−20° C.) or M50in(0° C.)/M50in(−20° C.) was set lower than the range specified in the present technology. Thus, the effect of improving the durability of the transponder was not obtained. In Comparative Example 4, the value of M50out(0° C.)/M50out(−20° C.) or M50in(0° C.)/M50in(−20° C.) was set to be higher than the range specified in the present technology, thus degrading the durability.

Next, pneumatic tires according to Comparative Examples 21 to 24 and according to Examples 21 to 34 were manufactured. In the pneumatic tires that have a tire size of 265/40ZR20 and include a tread portion extending in the tire circumferential direction and having an annular shape, a pair of sidewall portions respectively disposed on both sides of the tread portion, a pair of bead portions each disposed on an inner side of the pair of sidewall portions in the tire radial direction, and a carcass layer mounted between the pair of bead portions, a transponder is embedded, and the following are set as shown in Tables 3 and 4: the position of the transponder in the tire width direction, the position of the transponder in the tire radial direction, the M50out(20° C.)/M50out(100° C.), the M50in(20° C.)/M50in(100° C.), the presence of the coating layer, the relative dielectric constant of the coating layer, the thickness of the coating layer, the storage modulus E'c(20° C.) of the coating layer, the storage modulus E'c(60° C.) of the coating layer, the E'c(20° C.)/E'a(20° C.), the E'c(60° C.)/E'a(60° C.), and the E'c(20° C.)/E'c(60° C.).

In Comparative Examples 21 to 24 and Examples 21 to 34, the transponder having a pillar-like shape was used, and the distance from the center of the transponder to the splice portion of the tire component in the tire circumferential direction was set to 10 mm, and the distance from the cross-sectional center of the transponder to the tire outer surface was set to 2 mm or more.

In Tables 3 and 4, the position of the transponder in the tire width direction represented as "Inner side" means that the transponder is disposed on the inner side of the carcass layer in the tire width direction, and the position of the transponder in the tire width direction represented as "Outer side" means that the transponder is disposed on the outer side of the carcass layer in the tire width direction. Additionally, in Tables 3 and 4, the position of the transponder in the tire radial direction corresponds to each of the positions A to E illustrated in FIG. 6.

In Comparative Examples 22 to 24 and Examples 21 to 34, the outer member is a rim cushion rubber layer, and the inner member is a bead filler. In other words, in Tables 3 and 4, "M50out(20° C.)/M50out(100° C.)" is the ratio of the 50% deformation modulus in the rim cushion rubber layer, and "M50in(20° C.)/M50in(100° C.)" is the ratio of the 50% deformation modulus in the bead filler, corresponding to the inner member. Additionally, "E'c(20° C.)/E'a(20° C.)" and "E'c(60° C.)/E'a(60° C.)" is the ratio of the storage modulus in the coating layer to the storage modulus of the rim cushion rubber layer, corresponding to the rubber member adjacent to the outer side of the coating layer in the tire width direction. "E'c(20° C.)/E'c(60° C.)" is the ratio of the storage modulus in the coating layer. For Comparative Example 21, for convenience, the physical properties of the rim cushion rubber layer are indicated as the physical properties of the outer member, and the physical properties of the bead filler are indicated as the physical properties of the inner member.

Tire evaluation (durability) and transponder evaluation (communication performance and durability) were conducted on the above-described test tires using a test method described below, and the results are indicated in Tables 3 and 4.

Durability (Tire and Transponder):

Each of the test tires was mounted on a wheel of a standard rim, and a traveling test was performed by using a drum testing machine at a temperature of 38° C., an air pressure of 120 kPa, a load of 102% of the maximum load, and a traveling speed of 81 km/h. The traveling distance was measured when a failure occurred in the tire. Evaluation results are expressed as index values with Comparative Example 22 being assigned an index value of 100. Larger index values indicate superior tire durability. Furthermore, after the end of traveling, each test tire was checked for the availability of communication of the transponder and for damage to the transponder. Results are expressed as three levels: "Excellent" indicates that communication is enabled and that no damage is found, "Good" indicates that communication is enabled but that damage is found, and "Poor" indicates that communication is disabled.

Communication Performance (Transponder):

For each test tire, a communication operation with the transponder was performed using a reader/writer. Specifically, the maximum communication distance was measured with the reader/writer at a power output of 250 mW and a carrier frequency of from 860 MHz to 960 MHz. Evaluation results are expressed as index values with Comparative Example 22 being assigned an index value of 100. Larger index values indicate superior communication performance.

TABLE 3-1

|  | Comparative Example 21 | Comparative Example 22 | Comparative Example 23 | Comparative Example 24 |
| --- | --- | --- | --- | --- |
| Position of transponder in tire width direction | Inner side | Outer side | Outer side | Outer side |
| Position of transponder in tire radial direction | C | C | C | C |
| M50out(20° C.)/M50out(100° C.) | 0.9 | 0.9 | 1.5 | 3.0 |
| M50in(20° C.)/M50in(100° C.) | 2.0 | 2.0 | 0.4 | 4.5 |
| Presence of coating layer | No | No | No | No |
| Relative dielectric constant of coating layer | — | — | — | — |
| Thickness of coating layer (mm) | — | — | — | — |
| Storage modulus E'c(20° C.) of coating layer [MPa] | — | — | — | — |
| Storage modulus E'c(60° C.) of coating layer [MPa] | — | — | — | — |
| E'c(20° C.)/E'a(20° C.) | — | — | — | — |
| E'c(60° C.)/E'a(60° C.) | — | — | — | — |
| E'c(20° C.)/E'c(60° C.) | — | — | — | — |
| Tire evaluation Durability | 100 | 100 | 100 | 105 |
| Transponder evaluation Communication performance | 85 | 100 | 100 | 100 |
| Transponder evaluation Durability | Good | Good | Good | Poor |

TABLE 3-2

|  | Example 21 | Example 22 | Example 23 | Example 24 | Example 25 |
| --- | --- | --- | --- | --- | --- |
| Position of transponder in tire width direction | Outer side | Outer side | Outer side | Outer side | Outer side |
| Position of transponder in tire radial direction | C | E | D | B | A |
| M50out(20° C.)/M50out(100° C.) | 1.5 | 1.5 | 1.5 | 1.5 | 1.5 |
| M50in(20° C.)/M50in(100° C.) | 2.0 | 2.0 | 2.0 | 2.0 | 2.0 |
| Presence of coating layer | No | No | No | No | No |
| Relative dielectric constant of coating layer | — | — | — | — | — |
| Thickness of coating layer (mm) | — | — | — | — | — |
| Storage modulus E'c(20° C.) of coating layer [MPa] | — | — | — | — | — |
| Storage modulus E'c(60° C.) of coating layer [MPa] | — | — | — | — | — |
| E'c(20° C.)/E'a(20° C.) | — | — | — | — | — |
| E'c(60° C.)/E'a(60° C.) | — | — | — | — | — |
| E'c(20° C.)/E'c(60° C.) | — | — | — | — | — |
| Tire evaluation Durability | 105 | 105 | 105 | 105 | 103 |
| Transponder evaluation Communication performance | 100 | 98 | 100 | 100 | 100 |
| Transponder evaluation Durability | Good | Good | Good | Good | Good |

TABLE 4-1

|  | Example 26 | Example 27 | Example 28 | Example 29 | Example 30 |
| --- | --- | --- | --- | --- | --- |
| Position of transponder in tire width direction | Outer side | Outer side | Outer side | Outer side | Outer side |
| Position of transponder in tire radial direction | C | C | C | C | C |
| M50out(20° C.)/M50out(100° C.) | 1.5 | 1.5 | 1.5 | 1.5 | 1.5 |
| M50in(20° C.)/M50in(100° C.) | 2.0 | 2.0 | 2.0 | 2.0 | 2.0 |
| Presence of coating layer | Yes | Yes | Yes | Yes | Yes |
| Relative dielectric constant of coating layer | 7 | 8 | 7 | 7 | 7 |
| Thickness of coating layer (mm) | 0.2 | 0.2 | 0.5 | 1.0 | 3.0 |
| Storage modulus E'c(20° C.) of coating layer [MPa] | 6.0 | 6.0 | 6.0 | 6.0 | 6.0 |
| Storage modulus E'c(60° C.) of coating layer [MPa] | 5.0 | 5.0 | 5.0 | 5.0 | 5.0 |
| E'c(20° C.)/E'a(20° C.) | 0.8 | 0.8 | 0.8 | 0.8 | 0.8 |
| E'c(60° C.)/E'a(60° C.) | 0.7 | 0.7 | 0.7 | 0.7 | 0.7 |
| E'c(20° C.)/E'c(60° C.) | 1.2 | 1.2 | 1.2 | 1.2 | 1.2 |
| Tire evaluation Durability | 105 | 105 | 105 | 105 | 105 |
| Transponder evaluation Communication performance | 105 | 103 | 108 | 110 | 112 |
| Transponder evaluation Durability | Excellent | Excellent | Excellent | Excellent | Excellent |

TABLE 4-2

|  |  | Example 31 | Example 32 | Example 33 | Example 34 |
|---|---|---|---|---|---|
| Position of transponder in tire width direction | | Outer side | Outer side | Outer side | Outer side |
| Position of transponder in tire radial direction | | C | C | C | C |
| M50out(20° C.)/M50out(100° C.) | | 1.5 | 1.5 | 1.5 | 1.5 |
| M50in(20° C.)/M50in(100° C.) | | 2.0 | 2.0 | 2.0 | 2.0 |
| Presence of coating layer | | Yes | Yes | Yes | Yes |
| Relative dielectric constant of coating layer | | 7 | 7 | 7 | 7 |
| Thickness of coating layer (mm) | | 1.0 | 1.0 | 1.0 | 1.0 |
| Storage modulus E'c(20° C.) of coating layer [MPa] | | 1.5 | 12.5 | 6.0 | 6.0 |
| Storage modulus E'c(60° C.) of coating layer [MPa] | | 1.6 | 8.0 | 5.0 | 5.0 |
| E'c(20° C.)/E'a(20° C.) | | 0.8 | 0.8 | 0.05 | 1.6 |
| E'c(60° C.)/E'a(60° C.) | | 0.7 | 0.7 | 0.1 | 1.3 |
| E'c(20° C.)/E'c(60° C.) | | 0.9 | 1.6 | 1.2 | 1.2 |
| Tire evaluation | Durability | 105 | 105 | 105 | 105 |
| Transponder evaluation | Communication performance | 110 | 110 | 110 | 110 |
| | Durability | Good | Good | Good | Good |

Tables 3 and 4 indicate that in the pneumatic tires of Examples 21 to 34, as compared to Comparative Example 22, the durability and the communication performance and durability of the transponder were improved in a well-balanced manner.

On the other hand, in Comparative Example 21, the transponder was disposed on the inner side of the carcass layer in the tire width direction, and thus degrading the communication performance of the transponder. In Comparative Examples 21 and 23, the value of M50out(20° C.)/M50out(100° C.) or M50in(20° C.)/M50in(100° C.) was set lower than the range specified in the present technology, and thus the effect of improving the tire durability was not obtained. In Comparative Example 24, the value of M50out (20° C.)/M50out(100° C.) or M50in(20° C.)/M50in(100° C.) was set higher than the range specified in the present technology, thus degrading the durability of the transponder.

Next, pneumatic tires according to Comparative Examples 41 and 42 and according to Examples 41 to 58 were manufactured. In the pneumatic tires that have a tire size of 265/40ZR20 and include a tread portion extending in the tire circumferential direction and having an annular shape, a pair of sidewall portions respectively disposed on both sides of the tread portion, a pair of bead portions each disposed on an inner side of the pair of sidewall portions in the tire radial direction, and a carcass layer mounted between the pair of bead portions, a transponder is embedded, and the following are set as shown in Tables 5 and 6: the position of the transponder in the tire width direction, the position of the transponder in the tire radial direction, the |M50out(50° C.)–M50in(50° C.)|, the tan δout(60° C.) of the outer member, the tan δin(60° C.) of the inner member, the |tan δout(60° C.)–tan δin(60° C.)|, the tan δout(20° C.)/tan δout(100° C.), the tan δin(20° C.)/tan δin(100° C.), the presence of the coating layer, the relative dielectric constant of the coating layer, the thickness of the coating layer, the storage modulus E'c(20° C.) of the coating layer, the storage modulus E'c(60° C.) of the coating layer, the E'c(20° C.)/E'a(20° C.), the E'c(60° C.)/E'a(60° C.), and the E'c(20° C.)/E'c(60° C.).

In Comparative Examples 41 to 42 and Examples 41 to 58, the transponder having a pillar-like shape was used, the distance from the center of the transponder to the splice portion of the tire component in the tire circumferential direction was set to 10 mm, and the distance from the tire cross-sectional center of the transponder to the tire outer surface was set to 2 mm or more.

In Tables 5 and 6, the position of the transponder in the tire width direction represented as "Inner side" means that the transponder is disposed on the inner side of the carcass layer in the tire width direction, and the position of the transponder in the tire width direction represented as "Outer side" means that the transponder is disposed on the outer side of the carcass layer in the tire width direction. Additionally, in Tables 5 and 6, the position of the transponder in the tire radial direction corresponds to each of the positions A to E illustrated in FIG. 6.

In Comparative Example 42 and Examples 41 to 58, the outer member is a rim cushion rubber layer, and the inner member is a bead filler. In other words, in Tables 5 and 6, |"M50out(50° C.)–M50in(50° C.)|" is the absolute value of the difference between the 50% deformation modulus of the rim cushion rubber layer, which corresponds to the outer member, and the 50% deformation modulus of the bead filler, which corresponds to the inner member. "|tan δout(60° C.)–tan δin(60° C.)|" is the absolute value of the difference between the tan δ of the rim cushion rubber layer, which corresponds to the outer member, and the tan δ of the bead filler, which corresponds to the inner member. Additionally, "tan δout(20° C.)/tan δout(100° C.)" is the ratio of the tan δ in the rim cushion rubber layer, which corresponds to the outer member, and "tan δin(20° C.)/tan δin(100° C.)" is the ratio of the tan δ in the bead filler, which corresponds to the inner member. Additionally, "E'c(20° C.)/E'a(20° C.)" and "E'c(60° C.)/E'a(60° C.)" is the ratio of the storage modulus in the coating layer to the storage modulus of the rim cushion rubber layer, corresponding to the rubber member adjacent to the outer side of the coating layer in the tire width direction. "E'c(20° C.)/E'c(60° C.)" is the ratio of the storage modulus in the coating layer. For Comparative Example 41, for convenience, the physical properties of the rim cushion rubber layer are indicated as the physical properties of the outer member, and the physical properties of the bead filler are indicated as the physical properties of the inner member.

Tire evaluation (durability) and transponder evaluation (communication performance and durability) were conducted on the above-described test tires using a test method described below, and the results are indicated in Tables 5 and 6.

Durability (Tire and Transponder):

Each of the test tires was mounted on a wheel of a standard rim, and a traveling test was performed by using a drum testing machine at a temperature of 38° C., an air pressure of 120 kPa, a load of 102% of the maximum load, and a traveling speed of 81 km/h. The traveling distance was measured when a failure occurred in the tire. Evaluation results are expressed as index values with Comparative Example 42 being assigned an index value of 100. Larger index values indicate superior tire durability. Furthermore, after the end of traveling, each test tire was checked for the availability of communication of the transponder and for damage to the transponder. Results are expressed as three levels: "Excellent" indicates that communication is enabled and that no damage is found, "Good" indicates that communication is enabled but that damage is found, and "Poor" indicates that communication is disabled. Communication Performance (transponder):

For each test tire, a communication operation with the transponder was performed using a reader/writer. Specifically, the maximum communication distance was measured with the reader/writer at a power output of 250 mW and a carrier frequency of from 860 MHz to 960 MHz. Evaluation results are expressed as index values with Comparative Example 42 being assigned an index value of 100. Larger index values indicate superior communication performance.

TABLE 5-1

|  |  | Comparative Example 41 | Comparative Example 42 | Example 41 | Example 42 | Example 43 |
|---|---|---|---|---|---|---|
| Position of transponder in tire width direction |  | Inner side | Outer side | Outer side | Outer side | Outer side |
| Position of transponder in tire radial direction |  | C | C | C | E | D |
| \|M50out(50° C.) − M50in(50° C.)\| [MPa] |  | 5 | 11 | 5 | 5 | 5 |
| tanδout(60° C.) of outer member |  | 0.15 | 0.15 | 0.15 | 0.15 | 0.15 |
| tanδin(60° C.) of inner member |  | 0.15 | 0.15 | 0.15 | 0.15 | 0.15 |
| \|tanδout(60° C.) − tanδin(60° C.)\| |  | 0 | 0 | 0 | 0 | 0 |
| tanδout(20° C.)/tanδout(100° C.) |  | 1.5 | 1.5 | 1.5 | 1.5 | 1.5 |
| tanδin(20° C.)/tanδin(100° C.) |  | 1.5 | 1.5 | 1.5 | 1.5 | 1.5 |
| Presence of coating layer |  | No | No | No | No | No |
| Relative dielectric constant of coating layer |  | — | — | — | — | — |
| Thickness of coating layer (mm) |  | — | — | — | — | — |
| Storage modulus E'c(20° C.) of coating layer [MPa] |  | — | — | — | — | — |
| Storage modulus E'c(60° C.) of coating layer [MPa] |  | — | — | — | — | — |
| E'c(20° C.)/E'a(20° C.) |  | — | — | — | — | — |
| E'c(60° C.)/E'a(60° C.) |  | — | — | — | — | — |
| E'c(20° C.)/E'c(60° C.) |  | — | — | — | — | — |
| Tire evaluation | Durability | 105 | 100 | 105 | 105 | 105 |
| Transponder | Communication performance | 85 | 100 | 100 | 98 | 100 |
| evaluation | Durability | Good | Poor | Good | Good | Good |

TABLE 5-2

|  |  | Example 44 | Example 45 | Example 46 | Example 47 | Example 48 |
|---|---|---|---|---|---|---|
| Position of transponder in tire width direction |  | Outer side | Outer side | Outer side | Outer side | Outer side |
| Position of transponder in tire radial direction |  | B | A | C | C | C |
| \|M50out(50° C.) − M50in(50° C.)\| [MPa] |  | 5 | 5 | 5 | 5 | 5 |
| tanδout(60° C.) of outer member |  | 0.15 | 0.15 | 0.30 | 0.15 | 0.15 |
| tanδin(60° C.) of inner member |  | 0.15 | 0.15 | 0.05 | 0.15 | 0.15 |
| \|tanδout(60° C.) − tanδin(60° C.)\| |  | 0 | 0 | 0.25 | 0 | 0 |
| tanδout(20° C.)/tanδout(100° C.) |  | 1.5 | 1.5 | 1.5 | 0.7 | 1.5 |
| tanδin(20° C.)/tanδin(100° C.) |  | 1.5 | 1.5 | 1.5 | 1.5 | 0.7 |
| Presence of coating layer |  | No | No | No | No | No |
| Relative dielectric constant of coating layer |  | — | — | — | — | — |
| Thickness of coating layer (mm) |  | — | — | — | — | — |
| Storage modulus E'c(20° C.) of coating layer [MPa] |  | — | — | — | — | — |
| Storage modulus E'c(60° C.) of coating layer [MPa] |  | — | — | — | — | — |
| E'c(20° C.)/E'a(20° C.) |  | — | — | — | — | — |
| E'c(60° C.)/E'a(60° C.) |  | — | — | — | — | — |
| E'c(20° C.)/E'c(60° C.) |  | — | — | — | — | — |
| Tire evaluation | Durability | 105 | 103 | 105 | 105 | 105 |
| Transponder | Communication performance | 100 | 100 | 100 | 100 | 100 |
| evaluation | Durability | Good | Good | Good | Good | Good |

TABLE 6-1

|  | Example 49 | Example 50 | Example 51 | Example 52 | Example 53 |
|---|---|---|---|---|---|
| Position of transponder in tire width direction | Outer side | Outer side | Outer side | Outer side | Outer side |
| Position of transponder in tire radial direction | C | C | C | C | C |
| \|M50out(50° C.) − M50in(50° C.)\| [MPa] | 5 | 5 | 5 | 5 | 5 |
| tanδout(60° C.) of outer member | 0.15 | 0.15 | 0.15 | 0.15 | 0.15 |
| tanδin(60° C.) of inner member | 0.15 | 0.15 | 0.15 | 0.15 | 0.15 |

TABLE 6-1-continued

|  | Example 49 | Example 50 | Example 51 | Example 52 | Example 53 |
|---|---|---|---|---|---|
| \|tanδout(60° C.) − tanδin(60° C.)\| | 0 | 0 | 0 | 0 | 0 |
| tanδout(20° C.)/tanδout(100° C.) | 2.6 | 1.5 | 1.5 | 1.5 | 1.5 |
| tanδin(20° C.)/tanδin(100° C.) | 2.6 | 1.5 | 1.5 | 1.5 | 1.5 |
| Presence of coating layer | No | Yes | Yes | Yes | Yes |
| Relative dielectric constant of coating layer | — | 7 | 8 | 7 | 7 |
| Thickness of coating layer (mm) | — | 0.2 | 0.2 | 0.5 | 1.0 |
| Storage modulus E'c(20° C.) of coating layer [MPa] | — | 6.0 | 6.0 | 6.0 | 6.0 |
| Storage modulus E'c(60° C.) of coating layer [MPa] | — | 5.0 | 5.0 | 5.0 | 5.0 |
| E'c(20° C.)/E'a(20° C.) | — | 0.8 | 0.8 | 0.8 | 0.8 |
| E'c(60° C.)/E'a(60° C.) | — | 0.7 | 0.7 | 0.7 | 0.7 |
| E'c(20° C.)/E'c(60° C.) | — | 1.2 | 1.2 | 1.2 | 1.2 |
| Tire evaluation Durability | 105 | 105 | 105 | 105 | 105 |
| Transponder Communication performance | 100 | 105 | 103 | 108 | 110 |
| evaluation Durability | Good | Excellent | Excellent | Excellent | Excellent |

TABLE 6-2

|  | Example 54 | Example 55 | Example 56 | Example 57 | Example 58 |
|---|---|---|---|---|---|
| Position of transponder in tire width direction | Outer side | Outer side | Outer side | Outer side | Outer side |
| Position of transponder in tire radial direction | C | C | C | C | C |
| \|M50out(50° C.) − M50in(50° C.)\| [MPa] | 5 | 5 | 5 | 5 | 5 |
| tanδout(60° C.) of outer member | 0.15 | 0.15 | 0.15 | 0.15 | 0.15 |
| tanδin(60° C.) of inner member | 0.15 | 0.15 | 0.15 | 0.15 | 0.15 |
| \|tanδout(60° C.) − tanδin(60° C.)\| | 0 | 0 | 0 | 0 | 0 |
| tanδout(20° C.)/tanδout(100° C.) | 1.5 | 1.5 | 1.5 | 1.5 | 1.5 |
| tanδin(20° C.)/tanδin(100° C.) | 1.5 | 1.5 | 1.5 | 1.5 | 1.5 |
| Presence of coating layer | Yes | Yes | Yes | Yes | Yes |
| Relative dielectric constant of coating layer | 7 | 7 | 7 | 7 | 7 |
| Thickness of coating layer (mm) | 3.0 | 1.0 | 1.0 | 1.0 | 1.0 |
| Storage modulus E'c(20° C.) of coating layer [MPa] | 6.0 | 1.5 | 12.5 | 6.0 | 6.0 |
| Storage modulus E'c(60° C.) of coating layer [MPa] | 5.0 | 1.6 | 8.0 | 5.0 | 5.0 |
| E'c(20° C.)/E'a(20° C.) | 0.8 | 0.8 | 0.8 | 0.05 | 1.6 |
| E'c(60° C.)/E'a(60° C.) | 0.7 | 0.7 | 0.7 | 0.1 | 1.3 |
| E'c(20° C.)/E'c(60° C.) | 1.2 | 0.9 | 1.6 | 1.2 | 1.2 |
| Tire evaluation Durability | 105 | 105 | 105 | 105 | 105 |
| Transponder Communication performance | 102 | 100 | 100 | 100 | 100 |
| evaluation Durability | Excellent | Good | Good | Good | Good |

Tables 5 and 6 indicate that in the pneumatic tires of Examples 41 to 58, as compared to Comparative Example 42, the durability and the communication performance and durability of the transponder were improved in a well-balanced manner.

On the other hand, in Comparative Example 41, the transponder was disposed on the inner side of the carcass layer in the tire width direction, thus degrading the communication performance of the transponder. In Comparative Example 42, the value of/M50out(50° C.)−M50in(50° C.)/ was set higher than the range specified in the present technology, and thus the durability of the transponder was insufficient.

The invention claimed is:

1. A pneumatic tire, comprising:
a tread portion extending in a tire circumferential direction and having an annular shape;
a pair of sidewall portions respectively disposed on both sides of the tread portion;
a pair of bead portions each disposed on an inner side of the pair of sidewall portions in a tire radial direction; and
a carcass layer mounted between the pair of bead portions;
a transponder being embedded in an outer side of the carcass layer in a tire width direction, a rubber member having a largest storage modulus at 20° C. of rubber members located on an outer side of the transponder in the tire width direction having a modulus M50out(0° C.) during 50% deformation at 0° C. and a modulus M50out(−20° C.) during 50% deformation at −20° C. that satisfy a relationship 0.50≤M50out(0° C.)/M50out(−20° C.)<1.00, and a rubber member having a largest storage modulus at 20° C. of rubber members located on an inner side of the transponder in the tire width direction having a modulus M50in(0° C.) during 50% deformation at 0° C. and a modulus M50in(−20° C.) during 50% deformation at −20° C. that satisfy a relationship 0.25≤M50in(0° C.)/M50in(−20° C.)<1.00.

2. The pneumatic tire according to claim 1, wherein the transponder is covered with a coating layer, and a storage modulus E'c(0° C.) at 0° C. of the coating layer and a storage modulus E'a(0° C.) at 0° C. of a rubber member adjacent to an outer side of the coating layer in the tire width direction satisfy a relationship 0.15≤E'c(0° C.)/E'a(0° C.)≤1.30.

3. The pneumatic tire according to claim 1, wherein the transponder is covered with a coating layer, and a storage modulus E'c(−20° C.) at −20° C. of the coating layer and a storage modulus E'a(−20° C.) at −20° C. of the rubber member adjacent to the outer side of the coating layer in the tire width direction satisfy a relationship $0.15 \leq E'c(-20°\ C.)/E'a(-20°\ C.) \leq 1.30$.

4. The pneumatic tire according to claim 1, wherein the transponder is covered with a coating layer, and a storage modulus $E'c(-20°\ C.)$ at $-20°\ C.$ of the coating layer ranges from 3 MPa to 17 MPa.

5. The pneumatic tire according to claim 1, wherein the transponder is covered with a coating layer, and a storage modulus $E'c(0°\ C.)$ at $0°\ C.$ of the coating layer and a storage modulus $E'c(-20°\ C.)$ at $-20°\ C.$ of the coating layer satisfy a relationship $0.50 \leq E'c(0°\ C.)/E'c(-20°\ C.) \leq 0.95$.

6. The pneumatic tire according to claim 1, wherein the transponder is covered with a coating layer, and the coating layer has a relative dielectric constant of 7 or less.

7. The pneumatic tire according to claim 1, wherein the transponder is covered with a coating layer, and the coating layer is formed of rubber or elastomer and 20 phr or more of white filler.

8. The pneumatic tire according to claim 7, wherein the white filler includes from 20 phr to 55 phr of calcium carbonate.

9. The pneumatic tire according to claim 1, wherein a center of the transponder is disposed 10 mm or more away from a splice portion of a tire component in the tire circumferential direction.

10. The pneumatic tire according to claim 1, wherein the transponder is disposed between a position of 15 mm outer side of an upper end of a bead core of a bead portion in the tire radial direction and a tire maximum width position.

11. The pneumatic tire according to claim 1, wherein a distance between a cross-sectional center of the transponder and a tire outer surface is 2 mm or more.

12. The pneumatic tire according to claim 1, wherein the transponder is covered with a coating layer, and the coating layer has a thickness ranging from 0.5 mm to 3.0 mm.

13. The pneumatic tire according to claim 1, wherein the transponder includes an IC substrate configured to store data and an antenna configured to transmit and receive data, and the antenna has a helical shape.

14. A pneumatic tire, comprising:
a tread portion extending in a tire circumferential direction and having an annular shape;
a pair of sidewall portions respectively disposed on both sides of the tread portion;
a pair of bead portions each disposed on an inner side of the pair of sidewall portions in a tire radial direction; and
a carcass layer mounted between the pair of bead portions;
a transponder being embedded in an outer side of the carcass layer in a tire width direction, a rubber member having a largest storage modulus at $20°\ C.$ of rubber members located on an outer side of the transponder in the tire width direction having a modulus $M50out(20°\ C.)$ during 50% deformation at $20°\ C.$ and a modulus $M50out(100°\ C.)$ during 50% deformation at $100°\ C.$ that satisfy a relationship $1.0 \leq M50out(20°\ C.)/M50out(100°\ C.) < 2.5$, and a rubber member having a largest storage modulus at $20°\ C.$ of rubber members located on an inner side of the transponder in the tire width direction having a modulus $M50in(20°\ C.)$ during 50% deformation at $20°\ C.$ and a modulus $M50in(100°\ C.)$ during 50% deformation at $100°\ C.$ that satisfy a relationship $1.0 \leq M50in(20°\ C.)/M50in(100°\ C.) < 4.0$.

15. The pneumatic tire according to claim 14, wherein the transponder is covered with a coating layer, and a storage modulus $E'c(20°\ C.)$ at $20°\ C.$ of the coating layer and a storage modulus $E'a(20°\ C.)$ at $20°\ C.$ of a rubber member adjacent to an outer side of the coating layer in the tire width direction satisfy a relationship $0.1 \leq E'c(20°\ C.)/E'a(20°\ C.) \leq 1.5$.

16. The pneumatic tire according to claim 14, wherein the transponder is covered with a coating layer, and a storage modulus $E'c(60°\ C.)$ at $60°\ C.$ of the coating layer and a storage modulus $E'a(60°\ C.)$ at $60°\ C.$ of the rubber member adjacent to the outer side of the coating layer in the tire width direction satisfy a relationship $0.2 \leq E'c(60°\ C.)/E'a(60°\ C.) \leq 1.2$.

17. The pneumatic tire according to claim 14, wherein the transponder is covered with a coating layer, and the storage modulus $E'c(20°\ C.)$ at $20°\ C.$ of the coating layer ranges from 2 MPa to 12 MPa.

18. The pneumatic tire according to claim 14, wherein the transponder is covered with a coating layer, and the storage modulus $E'c(20°\ C.)$ at $20°\ C.$ of the coating layer and the storage modulus $E'c(60°\ C.)$ at $60°\ C.$ of the coating layer satisfy a relationship $1.0 \leq E'c(20°\ C.)/E'c(60°\ C.) \leq 1.5$.

19. A pneumatic tire, comprising:
a tread portion extending in a tire circumferential direction and having an annular shape;
a pair of sidewall portions respectively disposed on both sides of the tread portion;
a pair of bead portions each disposed on an inner side of the pair of sidewall portions in a tire radial direction; and
a carcass layer mounted between the pair of bead portions;
a transponder being embedded in an outer side of the carcass layer in the tire width direction, and an absolute value $|M50out(50°\ C.)-M50in(50°\ C.)|$ of a difference between a modulus $M50out(50°\ C.)$ during 50% deformation at $50°\ C.$ of a rubber member having a largest storage modulus at $20°\ C.$ of rubber members located on an outer side of the transponder in the tire width direction and a modulus $M50in(50°\ C.)$ during 50% deformation at $50°\ C.$ of a rubber member having a largest storage modulus at $20°\ C.$ of rubber members located on an inner side of the transponder in the tire width direction being 10 MPa or less.

20. The pneumatic tire according to claim 19, wherein the rubber member having the largest storage modulus at $20°\ C.$ of the rubber members located on the outer side of the transponder in the tire width direction has a tan $\delta out(60°\ C.)$ at $60°\ C.$ in a range from 0.05 to 0.30, and the rubber member having the largest storage modulus at $20°\ C.$ of the rubber members located on the inner side of the transponder in the tire width direction has a tan $\delta in(60°\ C.)$ at $60°\ C.$ in a range from 0.05 to 0.30.

21. The pneumatic tire according to claim 19, wherein an absolute value $|\tan \delta out(60°\ C.) - \tan \delta in(60°\ C.)|$ of a difference between the tandout($60°\ C.$) and the tan $\delta in(60°\ C.)$ is 0.2 or less.

22. The pneumatic tire according to claim 19, wherein the rubber member having the largest storage modulus at $20°\ C.$ of the rubber members located on the outer side of the transponder in the tire width direction has a tan $\delta out(20°\ C.)$ at $20°\ C.$ and a tan $\delta out(100°\ C.)$ at $100°\ C.$ that satisfy a relationship $0.8 \leq \tan \delta out(20°\ C.)/\tan \delta out(100°\ C.) \leq 2.5$, and the rubber member having the largest storage modulus at $20°\ C.$ of the rubber members located on the inner side of the transponder in the tire width direction has a tan $\delta in(20°\ C.)$ at 20° C. and a tan δin(100° C.) at 100° C. that satisfy a relationship 0.8≤tan δin(20° C.)/tan δin(100° C.)≤2.5.

* * * * *